United States Patent
Riasi et al.

(10) Patent No.: US 11,704,457 B2
(45) Date of Patent: Jul. 18, 2023

(54) METHODS, SOFTWARE, AND APPARATUS FOR POROUS MATERIAL OR MEDIUM CHARACTERIZATION, FLOW SIMULATION AND DESIGN

(71) Applicant: UNIVERSITY OF CINCINNATI, Cincinnati, OH (US)

(72) Inventors: Mohammad Sadegh Riasi, Cincinnati, OH (US); Lilit Yeghiazarian, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 1123 days.

(21) Appl. No.: 16/009,757

(22) Filed: Jun. 15, 2018

(65) Prior Publication Data

US 2019/0005172 A1  Jan. 3, 2019

(30) Foreign Application Priority Data

Jun. 16, 2017  (WO) ................ PCT/US2017/037847

(51) Int. Cl.
*G06F 30/20* (2020.01)
*G06F 30/23* (2020.01)
*G06T 7/62* (2017.01)
*G06T 7/00* (2017.01)
*G06F 111/10* (2020.01)

(52) U.S. Cl.
CPC .............. *G06F 30/23* (2020.01); *G06F 30/20* (2020.01); *G06T 7/0004* (2013.01); *G06T 7/62* (2017.01); *G06F 2111/10* (2020.01)

(58) Field of Classification Search
CPC ...... G06F 30/23; G06F 30/20; G06F 2111/10; G06T 7/0004; G06T 7/62
See application file for complete search history.

(56) References Cited

U.S. PATENT DOCUMENTS

| | | | |
|---|---|---|---|
| 2013/0055736 A1* | 3/2013 | Everett | F24F 5/0021 62/271 |
| 2014/0044315 A1* | 2/2014 | Derzhi | G06T 7/11 382/109 |
| 2017/0022984 A1* | 1/2017 | White | F04C 29/021 |
| 2018/0121579 A1* | 5/2018 | Fredrich | G06F 30/20 |

FOREIGN PATENT DOCUMENTS

| | | | | |
|---|---|---|---|---|
| CN | 103775078 A | * | 5/2014 | |
| CN | 102799717 B | * | 12/2014 | |
| JP | 2005104736 A | * | 4/2005 | ............... B28B 7/44 |

OTHER PUBLICATIONS

Riasi, M. Sadegh, Nikhil Kumar Palakurthi, Carlo Montemagno, and Lilit Yeghiazarian. "A feasibility study of the pore topology method (PTM), a medial surface-based approach to multi-phase flow simulation in porous media." Transport in Porous Media 115, No. 3 (2016): 519-539 (Year: 2016).*

(Continued)

*Primary Examiner* — Kandasamy Thangavelu
(74) *Attorney, Agent, or Firm* — Dinsmore & Shohl LLP

(57) ABSTRACT

Methods, software, and apparatuses for accurate and computationally fast and efficient topologic and geometric characterization of porous material or medium, flow characterization of porous material or medium, and porous material or medium design are described.

21 Claims, 23 Drawing Sheets

(56) References Cited

OTHER PUBLICATIONS

Liang, Z. R., P. C. Philippi, C. P. Fernandes, and F. S. Magnani. "Prediction of permeability from the skeleton of three-dimensional pore structure." SPE Reservoir Evaluation & Engineering 2, No. 02 (1999): 161-168 (Year: 1999).*

Silin, Dmitriy, and Tad Patzek. "Pore space morphology analysis using maximal inscribed spheres." Physica A: Statistical mechanics and its applications 371, No. 2 (2006): 336-360 (Year: 2006).*

Delerue, J. F., Edith Perrier, Z. Y. Yu, and B. Velde. "New algorithms in 3D image analysis and their application to the measurement of a spatialized pore size distribution in soils." Physics and Chemistry of the Earth, Part A: Solid Earth and Geodesy 24, No. 7 (1999): 639-644 (Year: 1999).*

Hughes, Richard G., and Martin J. Blunt. "Network modeling of multiphase flow in fractures." Advances in Water Resources 24, No. 3-4 (2001): 409-421 (Year: 2001).*

Jiang, Zeyun, Kejian Wu, G. Couples, Marinus Izaak Jan Van Duke, Kenneth Stuart Sorbie, and Jingsheng Ma. "Efficient extraction of networks from three-dimensional porous media." Water resources research 43, No. 12 (2007) 17 pages (Year: 2007).*

Lindquist, W. Brent, Sang-Moon Lee, David A. Coker, Keith W. Jones, and Per Spanne. "Medial axis analysis of void structure in three-dimensional tomographic images of porous media." Journal of Geophysical Research: Solid Earth 101, No. B4 (1996): 8297-8310 (Year: 1996).*

M. Sadegh Riasi, Gene Huang, Carlo Montemagno and Lilit Yeghiazarian, Pore Topology Method: A General and Fast Pore-Scale Modeling Approach to Simulate Fluid Flow in Porous Media, American Geophysical Union, 2014, 1 page abstract (Year: 2014).*

Lee, Ta-Chih, Rangasami L. Kashyap, and Chong-Nam Chu. "Building skeleton models via 3-D medial surface axis thinning algorithms." CVGIP: Graphical Models and Image Processing 56, No. 6 (1994): 462-478 (Year: 1994).*

* cited by examiner

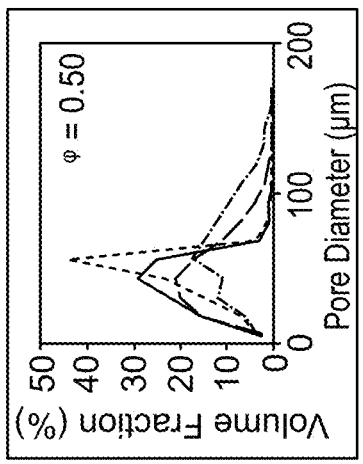
FIG. 5A
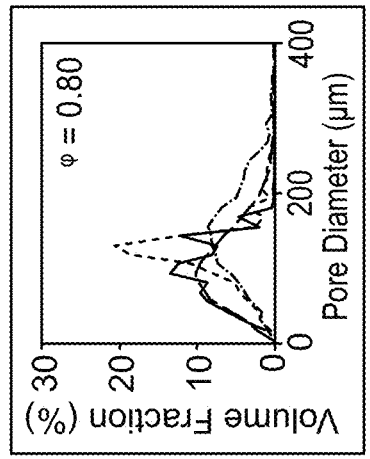
FIG. 5C
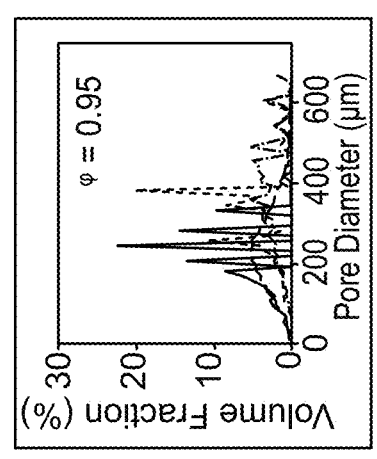
FIG. 5E
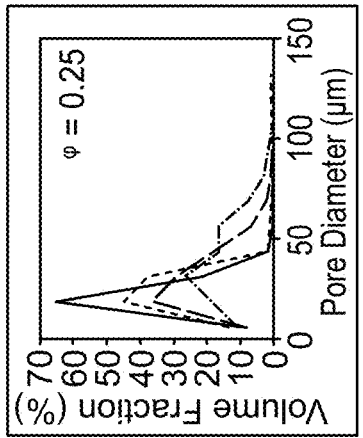
FIG. 5B
FIG. 5D
FIG. 5F
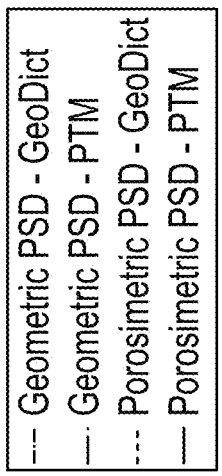

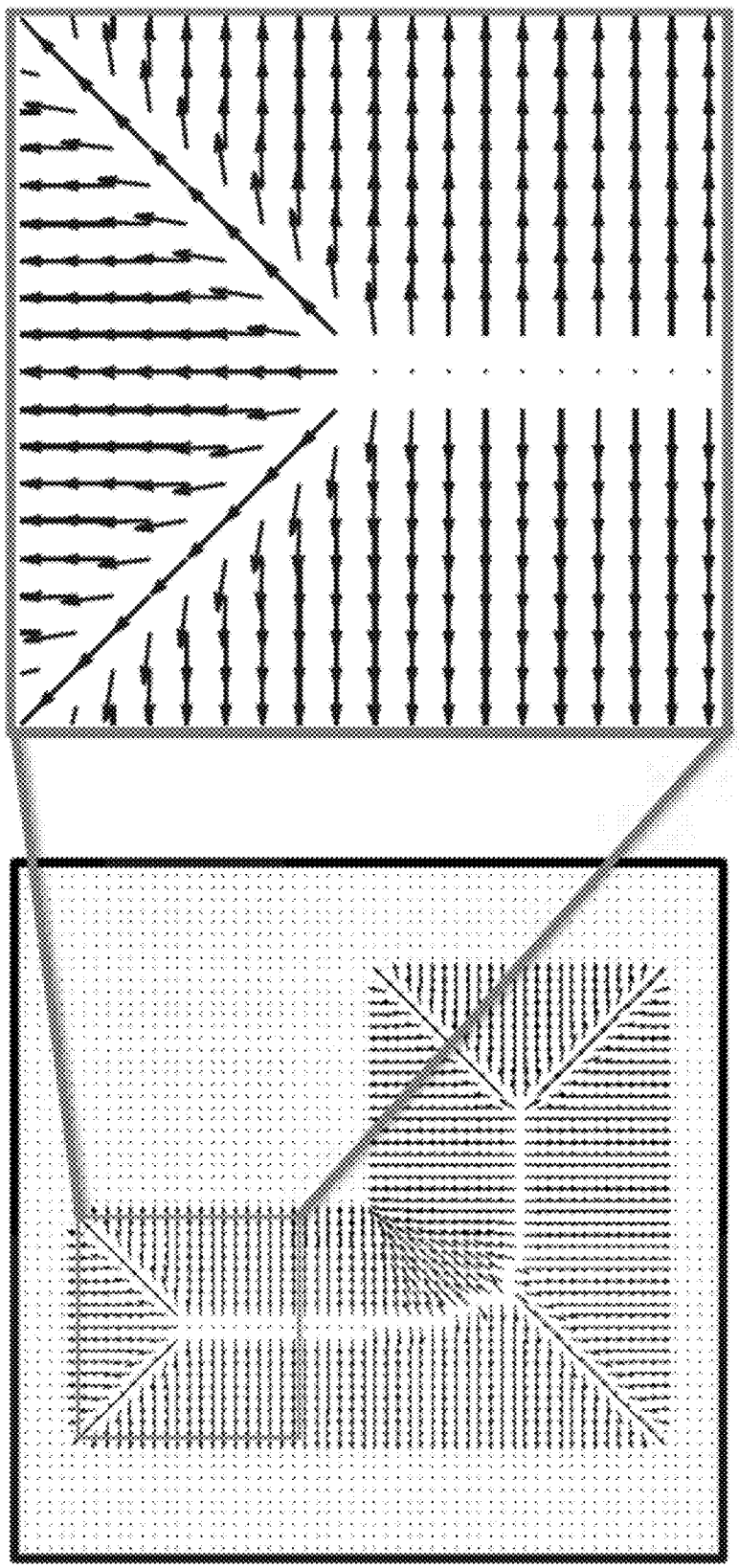

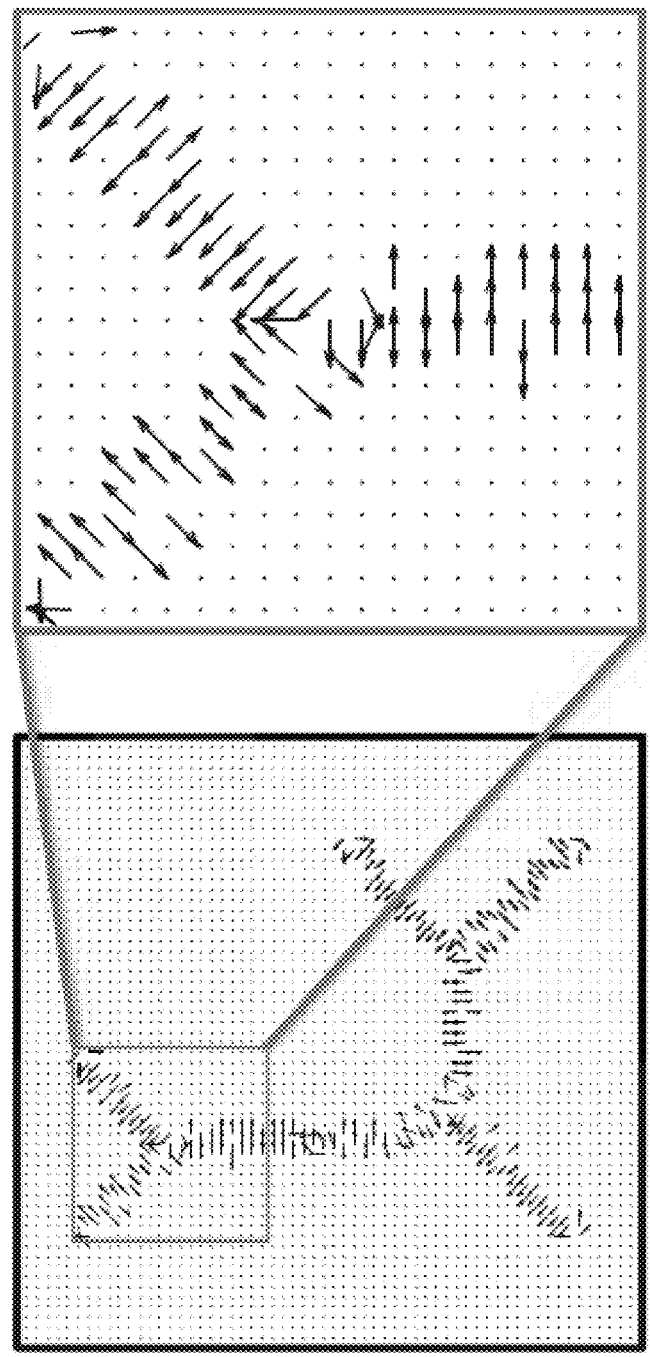

METHODS, SOFTWARE, AND APPARATUS FOR POROUS MATERIAL OR MEDIUM CHARACTERIZATION, FLOW SIMULATION AND DESIGN

GOVERNMENT RIGHTS

This invention was made with government support under Contract Nos. CBET-1248385 & CBET-1351361, awarded by the National Science Foundation. The government has certain rights in the invention.

CROSS-REFERENCE TO RELATED APPLICATION

This application claims priority under 35 U.S.C. § 119(a) to PCT Application No. PCT/US2017/37847, filed Jun. 16, 2017, the entire disclosure of which is incorporated herein by reference.

TECHNICAL FIELD

The presently disclosed subject matter relates to methods, software, and apparatuses for porous material or medium characterization, flow simulation, and design.

BACKGROUND

Thin, highly porous materials or media are ubiquitous in nature and widely employed in many products and devices. Examples of such materials or media range from living tissues, filters, membranes and absorbent materials, to fuel cells and microfluidic devices. Thus, there is a continuing need to better understand the structure and processes in these materials. Their distinct properties, however, present new challenges in experimental and numerical characterization.

Thin, highly porous materials are characterized by thickness on the order of pore dimension, and by porosity of larger than 60%. Therefore, computationally efficient micro-scale models designed to simulate multi-phase flow and characterize low-porosity media are challenged in thin, highly porous materials, primarily due to large, irregular pore spaces and inability to satisfy representative elementary volume (REV) requirements. Additionally, macroscale theories of transport do not hold. Furthermore, large, irregular pore spaces preclude easy characterization of the pore space geometry. Microscale models of flow in thin, highly porous media are promising, however their implementation is not trivial. Some of the challenges include computational cost and convergence in direct numerical simulation methods (DNS); while computationally fast techniques need to overcome difficulties in capturing the pore size distribution and computing respective entry capillary pressure, as well as in detecting the correct location of fluid interfaces for a range of contact angles.

Furthermore, a comprehensive understanding of effective property behavior based on microstructure characteristics is an important and active area of research. Generally, the governing equations relating the effective properties to the microstructure are known. Therefore, all that is now needed is a variety of methods to investigate the relationship. For example, in stochastic reconstruction, partial information of the material is known, and a virtual material is created based on this partial information. The effective properties of the virtual material is found and the original material is assumed to have similar effective properties. Topology optimization works in the reverse order. Usually the optimization process is given an effective property, and concerned with determining the material with the maximum effective property given some predefined constraints. Stochastic reconstruction gives a material and attempts to find the effective properties. Topology optimization gives the effective properties, and finds the material. Topology Optimization works by manipulating the distribution of the various solid and void phases of the space in order to minimize a function which represents the difference between the actual and the goal effective properties of the domain. For example, topology optimization can be used in creating porous scaffolds for tissue engineering. In this case, a material needs to be made with maximum mass transport through the material, but with target effective linear elastic properties. Topology Optimization is one method used to design microstructures with certain optimal or target properties given some constraints. Reconstruction of two phase materials has been achieved through many diverse methods including simulated annealing, texture synthesis, supervised learning, and level-cut fields. These methods rely on first characterizing a pre-existing material through either various statistical or physical descriptors, then using some reconstruction method to replicate these descriptors. However, due to overlap, and resolution errors, it is difficult to create a material with certain target properties based solely on carefully chosen input parameters. For example, though the pore size distribution of a single ellipsoid in the domain is known, finding the pore size distribution of the entire space varies significantly.

As such, there remains a need in the art new methods, software, and apparatuses for accurate and computationally fast and efficient methods, software, and apparatuses for porous material or medium characterization, flow simulation, and design.

SUMMARY

Accordingly, the presently disclosed subject matter relates to methods, software, and apparatuses for accurate and computationally fast and efficient topologic and geometric characterization of porous material or medium, flow characterization of porous material or medium, and porous material or medium design.

One embodiment of the presently-disclosed subject matter is directed to a method for topological and geometric characterization of a three-dimensional porous material or medium. The method comprises receiving an image of a three-dimensional porous material or medium configured to be disposed in a fluid flow-path, with the porous material or medium comprises a void space. The method further comprises extracting a medial surface of the void space of the porous material or medium, and utilizing the extracted medial surface of the void space of the porous material or medium as a representative geometry of the porous material or medium. The method additionally comprises calculating the pore size distribution of the void space of the porous material or medium based on the extracted medial surface of the void space.

An additional embodiment of the presently-disclosed subject matter is directed to a method for characterizing fluid flow through a three-dimensional porous material or medium. The method comprises receiving an image of a three-dimensional porous material or medium configured to be disposed in a fluid flow-path, with the porous material or medium comprising a void space, and extracting a medial surface of the void space of the porous material or medium. The method further comprises calculating an absolute permeability of the porous material or medium based at least partially on the extracted medial surface of the void space, and simulating multiphase drainage and/or simulating multiphase imbibition of the porous material or medium. Simulating multiphase drainage and/or simulating multiphase imbibition comprises utilizing the extracted medial surface of the void space of the porous material or medium as a solution domain for determining fluid flow through the porous material or medium.

A further embodiment of the presently-disclosed subject matter is directed to a method for designing a three-dimensional porous material or medium with target properties. The method comprises receiving an image of a random, three-dimensional porous material or medium configured to be disposed in a fluid flow-path, with the porous material or medium comprising a void space. The method further comprises extracting a medial surface of the void space of the porous material or medium, and utilizing the extracted medial surface of the void space of the porous material or medium as a representative geometry of the porous material or medium. The method also comprises calculating the pore size distribution of the void space of the porous material or medium based on the extracted medial surface of the void space, and calculating an absolute permeability of the porous material or medium based at least partially on the extracted medial surface of the void space.

These and additional embodiments and features of the presently-disclosed subject matter will be clarified by reference to the figures and detailed description set forth herein.

It is understood that both the preceding summary and the following detailed description are exemplary and are intended to provide further explanation of the disclosure as claimed. Neither the summary nor the description that follows is intended to define or limit the scope of the disclosure to the particular features mentioned in the summary or description.

BRIEF DESCRIPTION OF THE DRAWINGS

FIG. 1A depicts a 3-D model of a constant cross section prism. FIG. 1B. depicts the medial surface that is extracted from the constant cross-section prism of FIG. 1A, using the MLSEC-ST method.

FIG. 3A depicts a virtual 80% porous fibrous material generated with GeoDict. FIG. 3B depicts the medial surface of the virtual 80% porous fibrous material generated with GeoDict of FIG. 3A. FIG. 3C depicts a sliced image showing fibers (gray), the medial surface (white) and void space (black). FIG. 3D depicts the medial surface colored according to its distance map values. FIG. 3E depicts a sliced image for 25% porous fibrous material showing fibers (gray), the medial surface (white) and void space (black). FIG. 3F depicts a sliced image for 25% porous fibrous material colored according to its distance map values.

FIG. 4A depicts a 2-D cross-section of a virtual porous media having a porosity ($\varphi$) of 0.25. FIG. 4B depicts a 2D cross-section of a virtual porous media having a porosity ($\varphi$) of 0.50. FIG. 4C depicts a 2D cross-section of a virtual porous media having a porosity ($\varphi$) of 0.70. FIG. 4D depicts a 2D cross-section of a virtual porous media having a porosity ($\varphi$) of 0.80. FIG. 4E depicts a 2D cross-section of a virtual porous media having a porosity ($\varphi$) of 0.90. FIG. 4F depicts a 2D cross-section of a virtual porous media having a porosity ($\varphi$) of 0.95.

FIG. 5A-5F. FIG. 5A depicts a graphical representation of pore size distributions computed with GeoDict and PTM, using both porosimteric and geometric methods for porous medium having a porosity ($\varphi$) of 0.25. FIG. 5B depicts a graphical representation of pore size distributions computed with GeoDict and PTM, using both porosimteric and geometric methods for porous medium having a porosity ($\varphi$) of 0.50. FIG. 5C depicts a graphical representation of pore size distributions computed with GeoDict and PTM, using both porosimteric and geometric methods for porous medium having a porosity ($\varphi$) of 0.70. FIG. 5D depicts a graphical representation of pore size distributions computed with GeoDict and PTM, using both porosimteric and geometric methods for porous medium having a porosity ($\varphi$) of 0.80. FIG. 5E depicts a graphical representation of pore size distributions computed with GeoDict and PTM, using both porosimteric and geometric methods for porous medium having a porosity ($\varphi$) of 0.90. FIG. 5F depicts a graphical representation of pore size distributions computed with GeoDict and PTM, using both porosimteric and geometric methods for porous medium having a porosity ($\varphi$) of 0.95.

FIG. 12A-12B depicts a 2-D view of the principal eigenvector field (V) of the prism of FIG. 10A-10B, wherein FIG. 12B shows an enlarged portion of FIG. 12A.

FIG. 13A-13B depicts 2-D view of the reoriented principal eigenvector field (V) of the prism of the prism of FIG. 10A-10B, wherein FIG. 13B shows an enlarged portion of FIG. 13A.

FIG. 15A-15B depicts Suppression directions for Hessian-based NMS ($V_{HNMS}$), wherein FIG. 15B shows an enlarged portion of FIG. 15A.

FIG. 18A depicts N(D') seeds randomly distributed throughout the domain D'. FIG. 18B depicts 3-D random Poisson field X(x, y, z). FIG. 18C depicts porous medium generated by level-cutting the Poisson field. FIGS. 18D-18F depicts 2-D cross sections of FIGS. 18A-18C, respectively.

FIG. 19A depicts design for target porosity (target=50%, achieved=45.31%). FIG. 19B depicts design for target permeability (initial=0.73 Darcy, target=20 Darcy, achieved=19.82 Darcy). FIG. 19C depicts design for target normal pore size distribution (initial=3.09±1.31 voxels, target=5.00±1.00 voxels, achieved=4.95±1.14 voxels). The initial porous structure in FIGS. 19B-19C is the random porous medium of FIG. 19A.

DETAILED DESCRIPTION

Figure 1A:
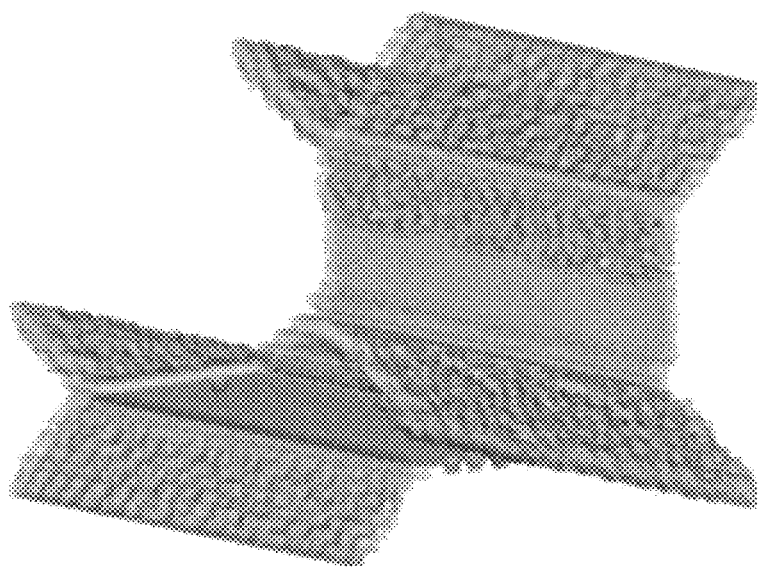
FIG. 1A-1B.

Particular details of various embodiments of the invention are set forth to illustrate certain aspects and not to limit the scope of the invention. It will be apparent to one of ordinary skill in the art that modifications and variations are possible without departing from the scope of the embodiments defined in the appended claims. More specifically, although some aspects of embodiments of the present invention may be identified herein as preferred or particularly advantageous, it is contemplated that the embodiments of the present invention are not limited to these preferred aspects.

Unless defined otherwise, all technical and scientific terms used herein have the same meaning as commonly understood by one of ordinary skill in the art to which the presently-disclosed subject matter belongs.

The instant disclosure is directed to methods, software, and apparatuses that utilize a fast and algorithmically simple method that reduces the complexity of the 3-D void space geometry to its topologically consistent medial surface, and uses this medial surface as the representative geometry for porous material or medium characterization and design, as well as the solution domain for single- and multi-phase flow simulations. Throughout the instant disclosure, this approach is referred to as the Pore Topology Method (PTM). The presently disclosed data demonstrates that the direct use of medial surface of the void space of a porous material or medium can be used as a representative geometry and as the solution domain for single- and multi-phase flow simulations. Further, the presently-disclosed data demonstrates that PTM can be used to extract the medial surface of the void space of the porous material or medium, the extracted medial surface can be used to find the domain's pore size distribution and permeability, and the medial surface can subsequently be manipulated to design a new material or medium with a target pore size distribution or target permeability. Accordingly, the presently disclosed data demonstrates that the extracted medial surface of the void space of a porous material or medium can be utilized as the representative geometry and solution domain to accurately and computationally efficiently derive the pore size distribution, compute the absolute and relative permeability, simulate quasi-static drainage and imbibition, and design porous materials or mediums with target properties. Comparison of results with other numerical methods and analytical solutions, including Lattice Boltzmann, full morphology, volume-of-fluid and finite volume methods, as well as exact solutions, showed a very good fit. Thus, despite its simplicity and low computational cost, PTM's single and-two-phase properties match closely with direct numerical techniques.

It is to be understood that, in some aspects, the instantly-disclosed methods directed to extracting the medial surface of the void space of a porous material or medium to be utilized as the representative geometry and solution domain to accurately and computationally efficiently characterize the topological and geometric features of a porous material or medium (e.g., derive the pore size distribution), characterize flow through a porous material or medium (e.g., compute the absolute and relative permeability and simulate quasi-static drainage and imbibition), and design porous materials or mediums with target properties (e.g., target pore size distribution and/or target absolute and/or relative permeability), may be performed within a computer system, using data stored within the computer system. For example, some aspects of the instant-disclosure are directed to an apparatus, the apparatus comprising a memory and a processor coupled to the memory, wherein the processor is configured to execute the steps of the instantly-disclosed methods. In other embodiments, the apparatus comprises a processor and a memory storing computer program instructions. When the computer program instructions are executed by the processor, the instructions cause the processor to perform operations that comprise the instantly-disclosed methods. Additionally, some embodiments of the instant-disclosure are directed to a non-transitory computer readable medium storying computer program instructions, the computer program instructions when executed on a processor cause the processor to perform operations comprising the instantly-disclosed methods.

Accordingly, the presently-disclosed subject matter includes a method for topological and geometric characterization of a three-dimensional porous material or medium. In some embodiments, the method comprises: receiving an image of a three-dimensional porous material or medium configured to be disposed in a fluid flow-path, the porous material or medium comprising a void space; extracting a medial surface of the void space of the porous material or medium; utilizing the extracted medial surface of the void space of the porous material or medium as a representative geometry of the porous material or medium; and calculating the pore size distribution of the void space of the porous material or medium based on the extracted medial surface of the void space.

In some embodiments of a method for topological and geometric characterization of a three-dimensional porous material or medium, the method comprises receiving an image of a three-dimensional porous material or medium configured to be disposed in a fluid flow-path. In embodiments, an image can be a virtual image or a digital image, which is often composed of digital representations of a three-dimensional porous material or medium. The virtual or digital representation of a porous material or medium, and/or the extracted medial surface therefrom, is often described in terms of identifying, extracting, and/or manipulating these objects, shapes, and/or medial surfaces. Thus, in embodiments, such manipulations are virtual manipulations, and can be accomplished in the memory or other circuitry/hardware of a computer system or as a non-transitory computer readable medium storying computer program instructions to be executed on a processor of a computer system. In some embodiments, the image is a binary image. In other embodiments, the image is a voxelized binary image. In further embodiments, the image is a mesh binary image.

In some embodiments of a method for topological and geometric characterization of a three-dimensional porous material or medium, the method comprises extracting a medial surface of the void space of the porous material or medium. Medial surfaces of 3-D objects were first proposed as shape descriptors and defined as "the loci of center of maximal spheres bi-tangent to the surface boundary points of the shape". Along the same lines, medial surfaces have also been described as "the locus of the center of an inscribed sphere of maximal diameter as it rolls around the interior of the object". Further, it has been described that an ideal medial surface of an object satisfies three conditions: i) homotopy: preserving the topology of the original object, ii) thinness and connectivity: generating a fully connected, voxel-wide medial surface; and iii) medialness: generating a medial surface that is as close as possible to the center of the object in all directions. These properties collectively stipulate that the medial surface of an object offers its compact representation, while retaining sufficient local information to reconstruct the object fully and with high accuracy. In embodiments of the instantly-disclosed methods in which the object in question is the void space of a porous material or medium, the homotopy and medialness of its medial surface would ensure that all corners and curvatures are captured, while thinness and connectivity would ensure that pore connectivity in void space is preserved.

In some embodiments of the instantly disclosed methods directed to extracting the medial surface of the void space of a porous material or medium to be utilized as the representative geometry and solution domain to accurately and computationally efficiently characterize the topological and geometric features of a porous material or medium (e.g., derive the pore size distribution), characterize flow through a porous material or medium (e.g., compute the absolute and relative permeability and simulate quasi-static drainage and imbibition), and design porous materials or mediums with target properties (e.g., target pore size distribution and/or target absolute and/or relative permeability), extracting a medial surface of the void space of the porous material or medium can be accomplished through thinning-based algorithms or non-maxima suppression based algorithms. Thinning based algorithms are known in the art, and extract the medial surface of a volume through morphological thinning of either the origin volume or an energy map generated within the volume, e.g., a distance map. Non-maxima suppression-based algorithms are also known in the art, and extract the medial surface by applying non-maxima suppression on a medialness map. A medialness map is generated through analytical manipulation of an energy map associated with the 3-D volume, e.g., a distance map. Non-maxima suppression-based algorithms are algorithmically simpler and generate fewer artifacts than thinning-based algorithms. The use of PTM of the instant disclosure in the instantly-disclosed methods for extracting medial surface of the void space of a porous material or medium to be utilized as the representative geometry and solution domain to accurately and computationally efficiently characterize the topological and geometric features of a porous material or medium (e.g., derive the pore size distribution), characterize flow through a porous material or medium (e.g., compute the absolute and relative permeability and simulate quasi-static drainage and imbibition), and design porous materials or mediums with target properties (e.g., target pore size distribution and/or target absolute and/or relative permeability) may be performed with any medial surface extraction approach.

In some embodiments of a method for topological and geometric characterization of a three-dimensional porous material or medium wherein the image of the three-dimensional porous material or medium comprises a voxelized binary image of the porous material or medium, the extracted medial surface is a voxel-wide medial surface. In some embodiments, a pore of the extracted medial surface is defined as a voxel-wide square prism, wherein the voxel-wide square prism is centered at each voxel of the medial surface and perpendicular to the medial surface at said voxel. However, it should be understood that the instantly-disclosed PTM is not limited to voxelized medial surfaces as the representative geometry and solution domain in porous media characterization, modeling, and design, and any medial surface can work. For example, a mesh-based approach (i.e., a medial surface with a mesh) or a curved surface approach can be utilized.

Figure 10B:
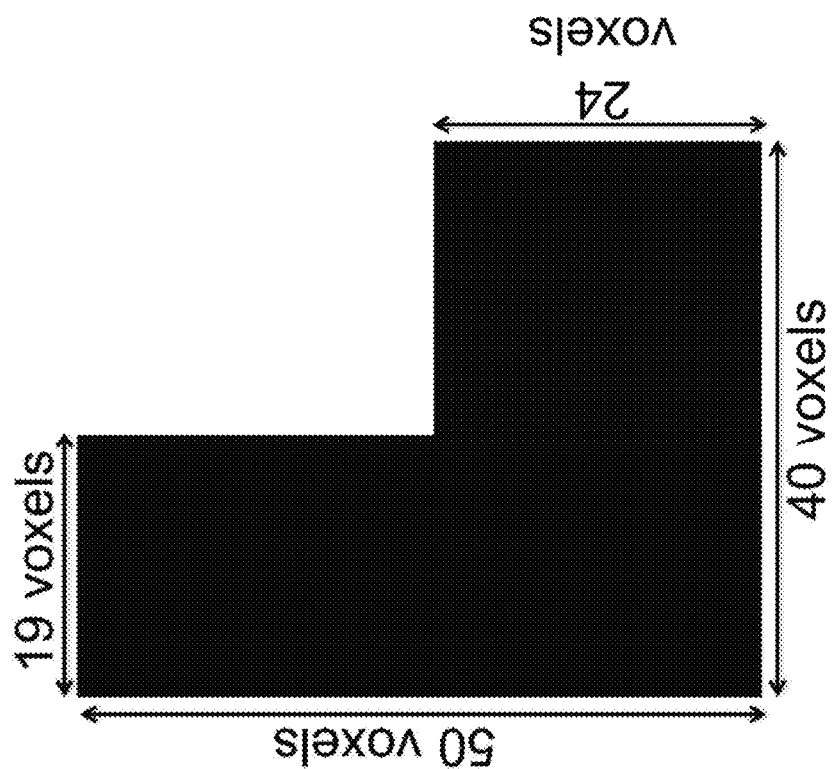
FIG. 10A-10B depicts a 3-D model of the prism (FIG. 10A) used in this example and its 2-D binary representation (FIG. 10B).

In certain embodiments of the instantly disclosed methods directed to extracting the medial surface of the void space of a porous material or medium to be utilized as the representative geometry and solution domain to accurately and computationally efficiently characterize the topological and geometric features of a porous material or medium (e.g., derive the pore size distribution), characterize flow through a porous material or medium (e.g., compute the absolute and relative permeability and simulate quasi-static drainage and imbibition), and design porous materials or mediums with target properties (e.g., target pore size distribution and/or target absolute and/or relative permeability), extracting a medial surface of the void space of the porous material or medium comprises utilization of a modified Multilocal Level-Set Extrinsic Curvature based on the Structure Tensor (MLSEC-ST). MLSEC-ST is a non-iterative analytical approach to the extraction of a voxel-wide medial surface of a 3-D object that is less sensitive to noise and has a higher reconstructive power compared to other available algorithms and produces surfaces that closely satisfy the conditions of an ideal medial surface. The modified MLSEC-ST disclosed herein ensures full connectivity of the final medial surface. Therefore, in some particular embodiments of the methods disclosed herein, extracting a medial surface of the void space void space of the porous material or medium comprises the following steps:

Obtaining a binary image of a porous material or media. In embodiments of the instantly-disclosed methods that in which the medial surface extraction algorithm is a voxel-based approach, obtaining a voxelized binary image of porous media is essential. In embodiments, binary images for porous materials can be obtained, for example but not by way of limitation, by either by using 3-D imaging of actual materials, or by using commercial packages like GeoDict. In the binary image shown in FIG. 10B, we labeled voxels of the solid matrix as one, and of void space as zero.

Figure 11:
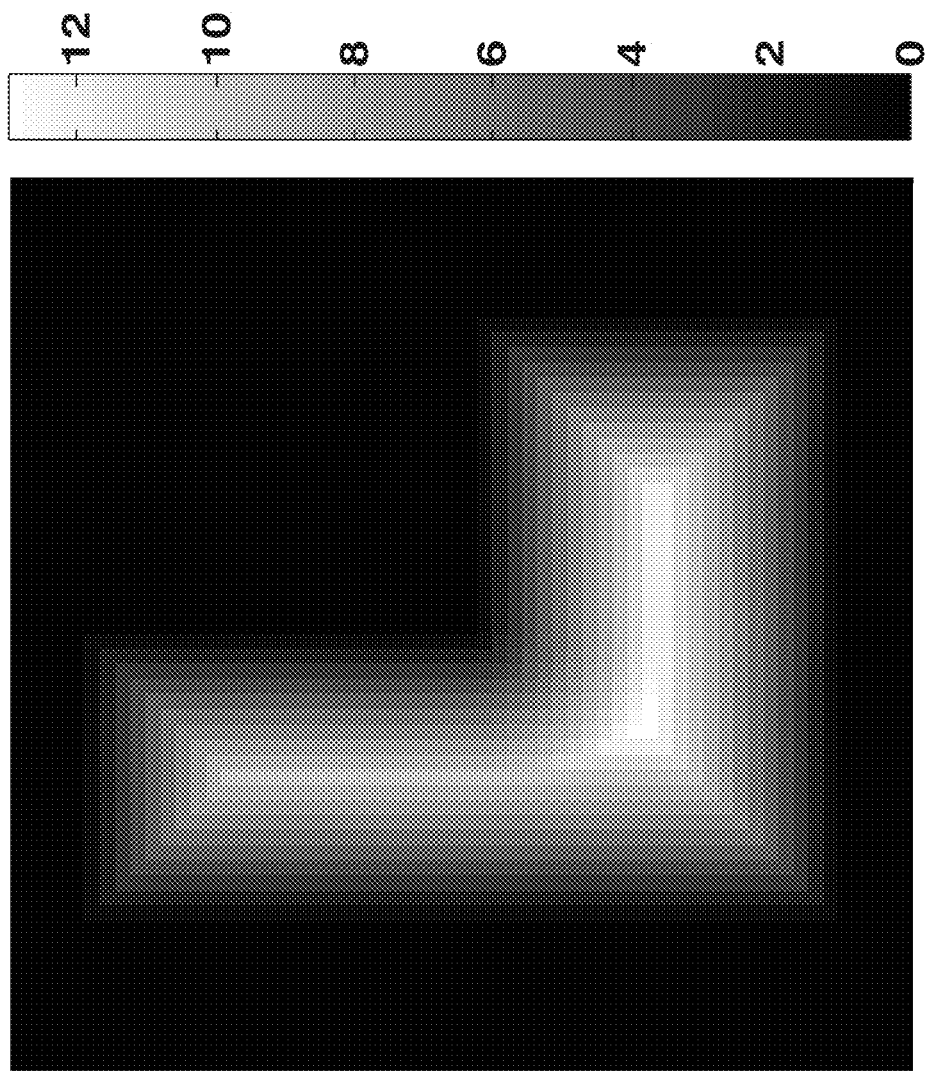
FIG. 11 depicts a 2-D slice of the distance map generated in the prism of FIG. 10A-10B.

Generating an Euclidean distance map (D). In embodiments, a distance map is generated inside the void space from the binary image of the porous material or media. Distance map D, also known as distance field or distance transform, is a representation of a digital image based on the distance between each voxel and the closest boundary (solid phase). Assuming solid voxels (1-value voxels) as boundary voxel, the distance map of the void space can be generated by computing the distance between each void voxel and the closest solid voxel. FIG. 11 shows the distance map of the sample prism.

Computing the gradient of distance map. In embodiments, the gradient of distance map can be computed by convolving the distance map with gradients of Gaussian kernel:

$$\nabla D = (\partial_x D\sigma, \partial_y D_\sigma, \partial_z D_\sigma) = (\partial_x g_\sigma * D, \partial_y g_\sigma * D, \partial_z g_\sigma * D) \quad (1)$$

where $\partial_x g_\sigma$, $\partial_y g_\sigma$ and $\partial_z g_\sigma$ are partial derivatives of the Gaussian kernel g with standard deviation of σ and * is the convolution operator. To avoid over-smoothing we used 3×3×3 voxels window kernels with σ=0.5.

Computing the structure tensor (ST). The structure tensor (ST) summarizes the dominant directions of the gradients in a neighborhood of each voxel, and is derived from the gradient field of a function. Smoothed ST at each voxel can be computed as $$ST_{\rho,\sigma}(D) = \begin{pmatrix} g_\rho * \partial_x D_\sigma^2 & g_\rho * \partial_x D_\sigma \partial_y D_\sigma & g_\rho * \partial_x D_\sigma \partial_z D_\sigma \\ g_\rho * \partial_y D_\sigma \partial_x D_\sigma & g_\rho * \partial_y D_\sigma^2 & g_\rho * \partial_y D_\sigma \partial_z D_\sigma \\ g_\rho * \partial_z D_\sigma \partial_x D_\sigma & g_\rho * \partial_z D_\sigma \partial_y D_\sigma & g_\rho * \partial_z D_\sigma^2 \end{pmatrix} \quad (2)$$

where $g_\rho$ is a 3×3×3 Gaussian kernel with standard deviation of ρ. In embodiments, ρ=1, although it should be understood that ρ can be adjusted as needed.

Figures 12A, 12B:
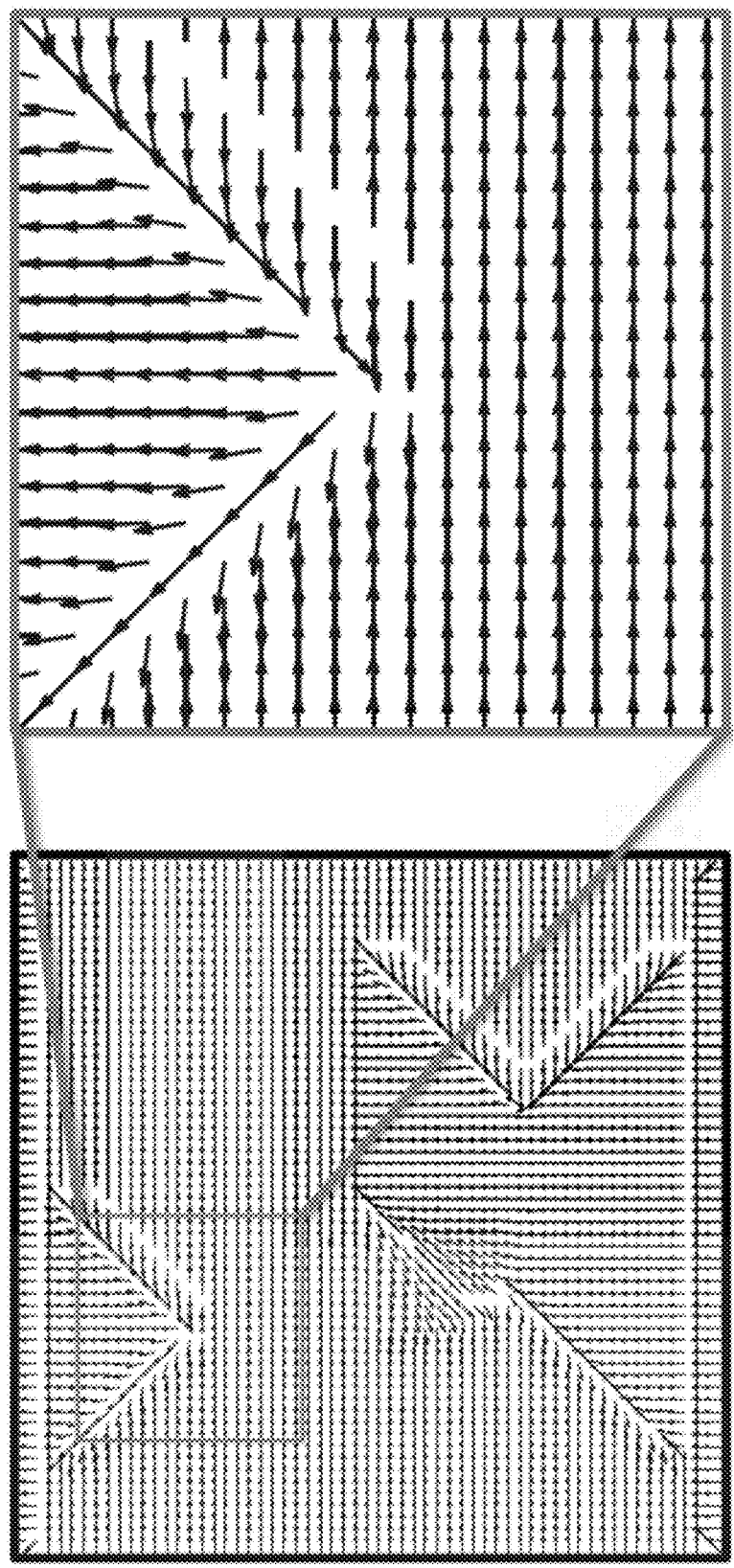

Find principal eigenvectors. ST is a positive definite tensor, therefore it has three non-negative eigenvalues for a 3D problem. In embodiments in which the structure tensor is built from the gradients of the distance map, the eigenvectors at each voxel are the directions of principal gradients of distance map at the neighborhood of that voxel. To find the direction of the maximum gradient at each voxel, one needs to find the principal eigenvector of ST (i.e. the eigenvector corresponding to the maximum eigenvalue) at that voxel. For the sample prism of FIG. A1, the 2-D view of the principal eigenvector field (V) is shown in FIG. 12.

Reorient principal eigenvectors in the direction of gradient. To prepare the vector field for the next step, all the principal eigenvectors need to point toward the downward gradient. Reorienting the principal eigenvectors toward the downward gradient can be done by multiplying each vector by the sign of the scalar product of principal eigenvector and the gradient at each voxel:

$$V = \text{sign}(V \cdot \nabla D) \cdot V \quad (3)$$

As shown in FIG. 13, besides reorienting the principal eigenvector field, this assigns zero to zero-gradient voxels.

Compute normalized ridge map (NRM). Since the magnitude of all vectors in V is less than or equal to one, taking the divergence of V will assign a value between −N and +N to each voxel, where N is the dimension of the problem. For a 3-D geometry, this value will be bounded between −3 and +3. This value is referred to as the normalized ridge map (NRM). Positive NRMs correspond to ridge voxels, and negative to valley voxels, therefore the magnitude of NRM value represents the degree of ridgeness or valleyness. NRM can be calculated as $$NRM = \text{div}(V) \quad (4)$$

Figure 14:
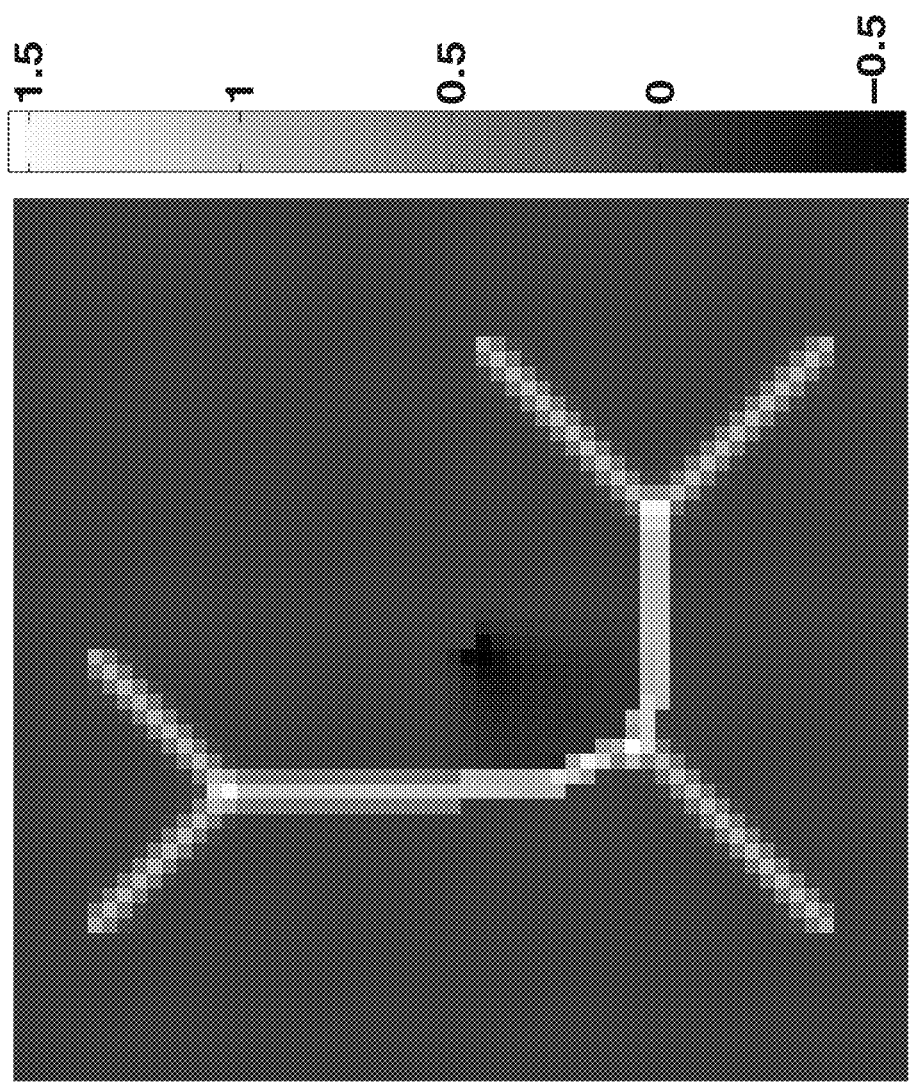
FIG. 14 depicts a 2-D slice of the normalized ridge map generated for the sample prism of FIG. 10A-10B.

A 2-D view of NRM for the sample prism is shown in FIG. 14. For the purpose of medial surface extraction, interest is in ridges (positive NRMs), therefore non-positive values can be ignored at the end of this step.

Medial surface thinning: Hessian-based non-maxima suppression. The last step is to apply a thinning algorithm on the positive NRM values to extract a voxel wide medial surface. A common thinning algorithm is non-maxima suppression (NMS). In NMS, one first needs to find a suppression direction, which is the direction perpendicular to the medial surface. The common practice is to use the direction of principal gradient of the NRM at each voxel as the suppression direction. It should be noted that the direction of principal gradient of NRM is the principal eigenvector of the structure tensor of NRM. However, it has been shown that implementing NMS on NRM map will introduce holes (disconnectivities) in the medial surface. Although this drawback can be ignored in many image processing cases, for embodiments of the instant-disclosure it will change the connectivity of the void space of the porous media, which is undesirable. To overcome this drawback, embodiments of the instant-disclosure are directed to a modified NMS algorithm based on using the direction of maximum curvature of NRM as the suppression direction. The direction of maximum curvature of NRM is the principal eigenvector of Hessian tensor of NRM. Hessian matrix is a symmetric matrix that summarizes the dominant directions of curvatures at a neighborhood of a voxel. Instead of using the structure tensor of NRM, modified NMS uses the Hessian tensor of NRM map to find the suppression direction. The instant-disclosure refers to this non-maxima suppression method as the Hessian-based Non-Maxima Suppression (HNMS). In HNMS, the principal eigenvector of Hessian tensor of NRM at each point is chosen as the suppression direction. We computed the Hessian matrix at each voxel as below:

$$H_{\rho,\sigma}(NRM) = \begin{pmatrix} \partial_{xx} g_\rho * NRM & \partial_{xy} g_\rho * NRM & \partial_{xz} g_\rho * NRM \\ \partial_{yx} g_\rho * NRM & \partial_{yy} g_\rho * NRM & \partial_{yz} g_\rho * NRM \\ \partial_{zx} g_\rho * NRM & \partial_{zy} g_\rho * NRM & \partial_{zz} g_\rho * NRM \end{pmatrix} \quad (5)$$

wherein $\partial_{x_i x_j} g_\rho$ is the second derivative of the Gaussian kernel with respect to coordinates $x_i$ and $x_j$, and ρ=1. Let $V_{HNMS}$ be the principal eigenvector of the Hessian matrix at each voxel. The non-maxima suppression can be computed as $$NMS(x, y, z) = \begin{cases} 1 & \text{if } NRM(x, y, z) > \max\{NRM(V_{HNMS}^+), NRM(V_{HNMS}^-)\} \\ 0 & \text{otherwise} \end{cases} \quad (6)$$

wherein $NRM(V_{HNMS}^+)$ and $NRM(V_{HNMS}^-)$ are NRM values in the immediate neighborhood of a voxel in the direction of $V_{HNMS}$.

Figure 16B:
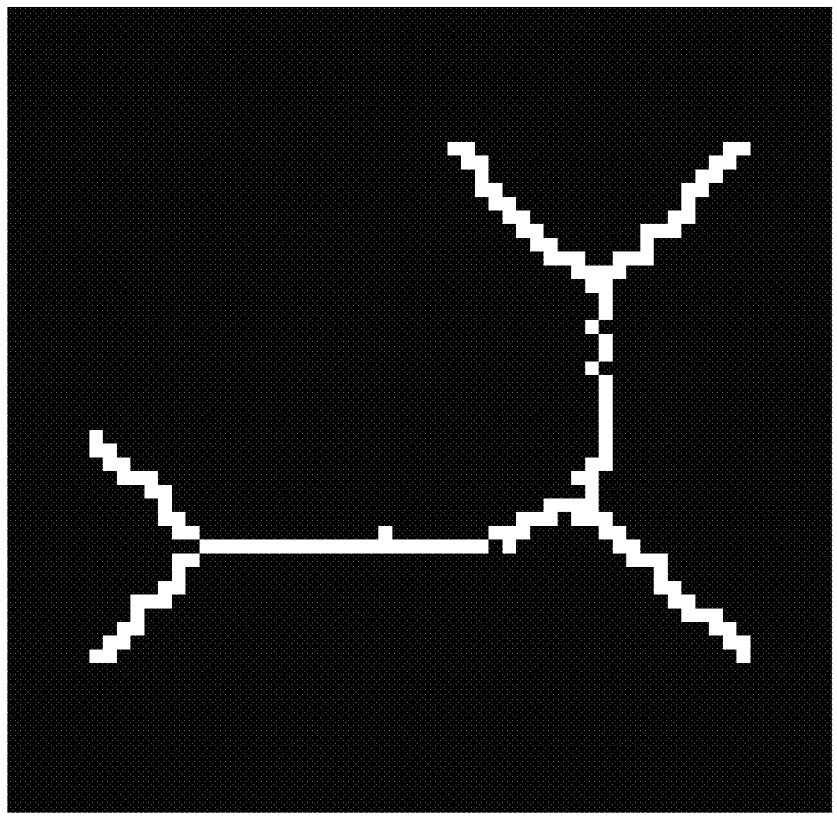
FIG. 16A-16B depicts a 2-D (FIG. 16A) and 3-D (FIG. 16B) extracted medial surface for the sample prism of FIG. 10A-10B.
Figure 16A:
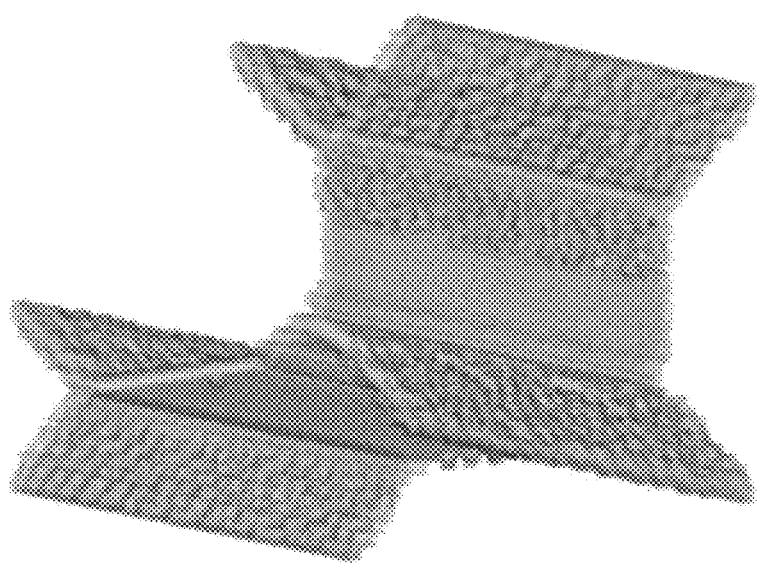

FIG. 15 shows the suppression directions in the proposed Hessian-based NMS. It should be noted that the ideal suppression direction should be perpendicular to the medial surface. Finally, FIG. 16A-B shows 2-D and 3-D views of the extracted medial surface for the sample prism, respectively.

In some embodiments, once the medial surface of the void space is extracted, the weighted medial surface (M) can be generated by assigning a value r to each voxel on the medial surface, wherein r is equal to the distance between the medial surface and the closest solid boundary.

One of the most important features of a medial surface is its reconstructive power. It has been shown that using the medial surface and its corresponding r distribution (weighted medial surface), one can fully reconstruct the original medium with a high accuracy. This can be achieved by placing a sphere of radius r at each voxel. To accelerate the process and avoid errors caused by limited voxel resolution, some embodiments comprise the following steps:

Create zero matrices of $C \in \mathbb{R}^{l_1 \times l_2 \times l_3}$ and $D \in \mathbb{R}^{l_1 \times l_2 \times l_3}$, wherein $l_1$, $l_2$ and $l_3$ are the dimensions of the porous medium.

Given the weighted medial surface M, find the unique weights (r values in voxels) on the medial surface. Store the unique values in vector R.

For each value $R_i$ in R:
a) Find the voxels in C that corresponds to the medial surface voxels weighted by R. Mark these voxels by one and all others by zero.
b) Find the distance map of C, where each zero-voxel takes the value equal to the distance of that voxel to the closest one-voxel.
c) Threshold C by $R_i-\beta$, where $\beta$ is the relaxation factor used to relax resolution errors. As the result of thresholding, voxels in C with values larger than $R_i-\beta$ become zero and the rest become one. Update matrix $D=D \cup C$.

Find the logical negation of D ($D=\sim D$). Binary matrix D is the reconstructed porous structure, where one-voxels represent solid and zero-voxels represent void space.

In some embodiments of a method for topological and geometric characterization of a three-dimensional porous material or medium, the method comprises calculating the pore size distribution of the void space of the porous material or medium based on the extracted medial surface of the void space. In embodiments, calculating the pore size distribution of the void space of the porous material or medium based on the extracted medial surface of the void space comprises assigning a value r to each voxel on the medial surface, wherein r is equal to the distance between the medial surface voxel and a closest solid boundary, and wherein the pore size distribution of the porous material or medium is the distribution of r values on the medial surface voxels.

In some aspects, the presently-disclosed subject matter includes a method for characterizing fluid flow through a three-dimensional porous material or medium. In embodiments, the method comprises: receiving an image of a three-dimensional porous material or medium configured to be disposed in a fluid flow-path, said porous material or medium comprising a void space; extracting a medial surface of the void space of the porous material or medium; calculating an absolute permeability of the porous material or medium based at least partially on the extracted medial surface of the void space; and simulating multiphase drainage and/or simulating multiphase imbibition of the porous material or medium, said simulating comprising utilizing the extracted medial surface of the void space of the porous material or medium as a solution domain for determining fluid flow through the porous material or medium.

In some embodiments of a method for characterizing fluid flow through a three-dimensional porous material or medium, the method comprises receiving an image of a three-dimensional porous material or medium configured to be disposed in a fluid flow-path. In embodiments, an image can be a virtual image or a digital image, which is often composed of digital representations of a three-dimensional porous material or medium. The virtual or digital representation of a porous material or medium, or the extracted medial surface therefrom, is in the often described in terms of identifying or manipulating these objects or shapes. Thus, in embodiments, such manipulations are virtual manipulations, and can be accomplished in the memory or other circuitry/hardware of a computer system, or as a non-transitory computer readable medium storying computer program instructions to be executed on a processor of a computer system. In certain embodiments, the image is a binary image. In other embodiments, the image is a voxelized binary image. In further embodiments, the image is a mesh binary image.

In some embodiments of a method for characterizing fluid flow through a three-dimensional porous material or medium, the method comprises extracting a medial surface of the void space of the porous material or medium, as described previously.

In some embodiments of a method for characterizing fluid flow through a three-dimensional porous material or medium wherein the image of the three-dimensional porous material or medium comprises a voxelized binary image of the porous material or medium, the extracted medial surface is a voxel-wide medial surface. In some embodiments, a pore of the extracted medial surface is defined as a voxel-wide square prism, wherein the voxel-wide square prism is centered at each voxel of the medial surface and perpendicular to the medial surface at said voxel. However, it should be understood that the instantly-disclosed PTM is not limited to voxelized medial surfaces as the representative geometry and solution domain in porous media characterization, modeling, and design, and any medial surface can work. For example, a mesh-based approach (i.e., a medial surface with a mesh) or a curved surface approach can be utilized.

Figure 2:
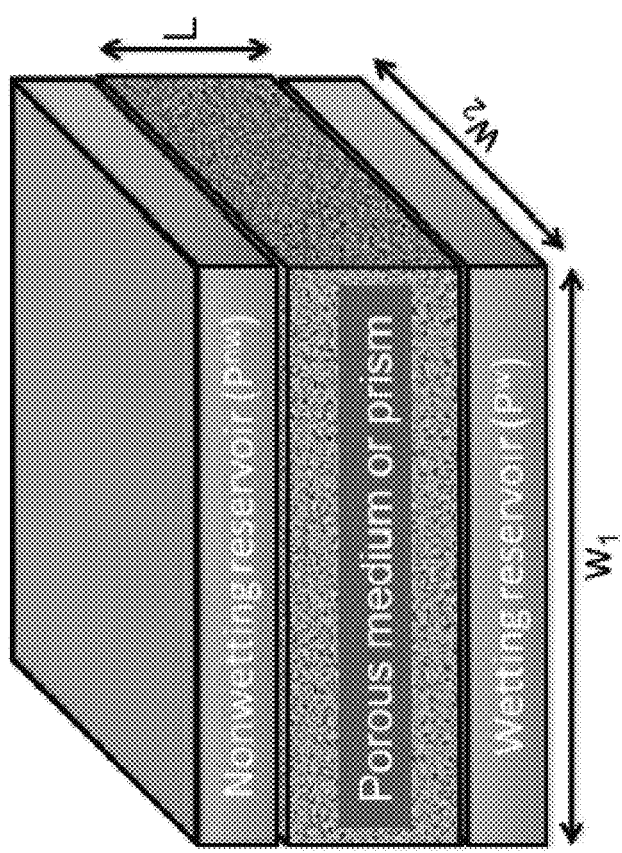
FIG. 2. A schematic of the problem set up for quasi-static drainage and imbibition simulation and permeability calculation. Boundary conditions include nonwetting ($P^{nw}$) and wetting phase reservoirs ($P^w$) at the top and bottom of the porous medium or prism, respectively, and no-flux conditions on all other sides.
Figure 3A:
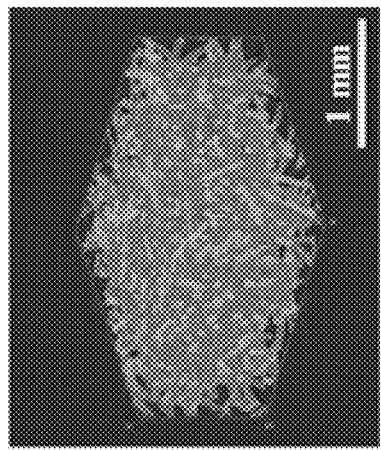
FIG. 3A-3F.
Figure 3B:
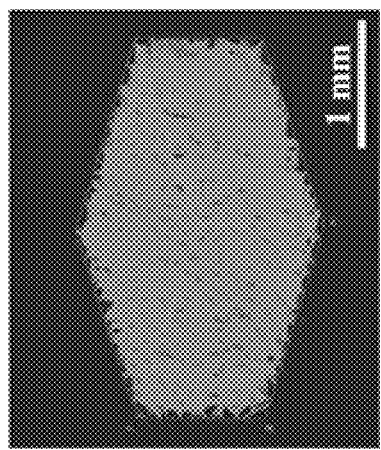
Figure 3D:
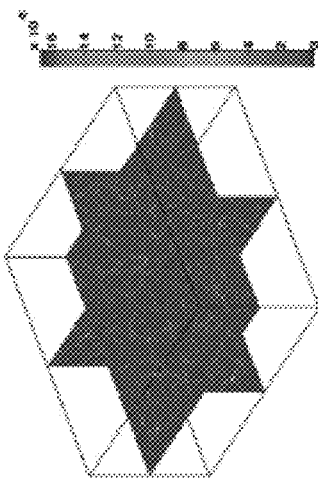
Figure 3F:
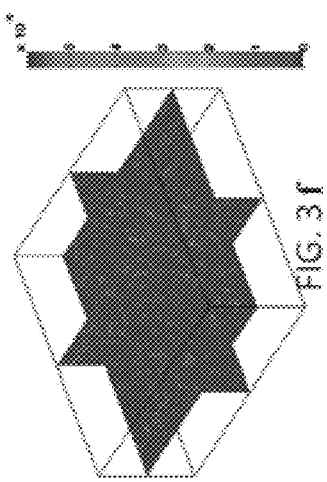
Figure 3C:
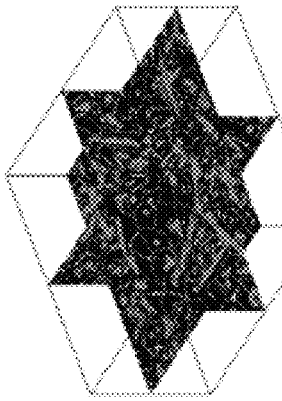
Figure 3E:
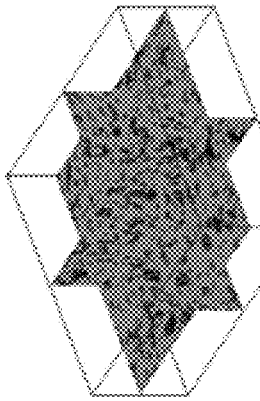
Figure 4C:
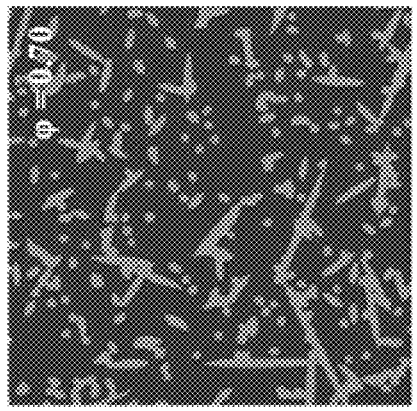
FIG. 4A-4F.
Figure 4F:
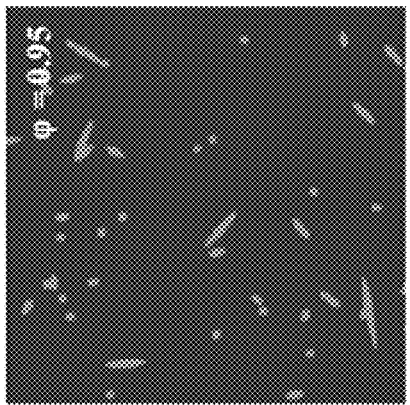
Figure 4B:
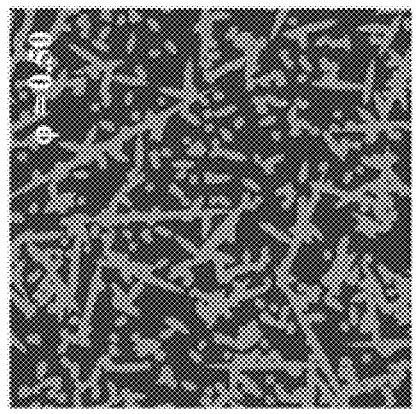
Figure 4E:
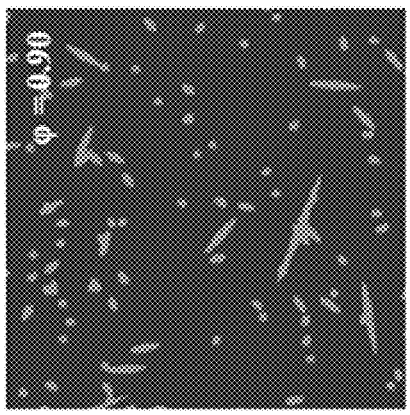
Figure 4A:
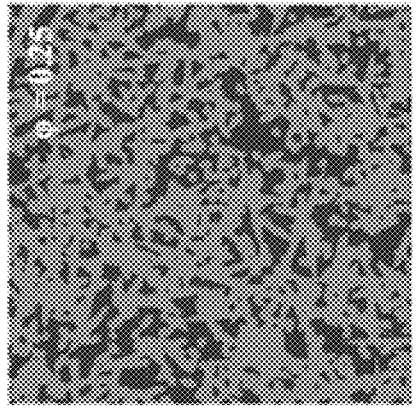
Figure 4D:
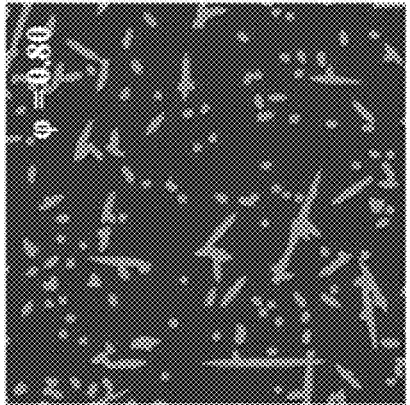

In some embodiments of characterizing fluid flow through a three-dimensional porous material or medium, the method comprises boundary conditions, the boundary conditions comprising a non-wetting reservoir at the top of the set up, a wetting phase reservoir at the bottom of the setup, and no-flux conditions on the sides of the set up, as shown in FIG. 2.

In some embodiments of characterizing fluid flow through a three-dimensional porous material or medium, the method comprises calculating the absolute permeability of the porous material or medium based at least partially on the extracted medial surface of the void space. In some embodiments, calculating the absolute permeability of the porous material or medium based at least partially on the extracted medial surface of the void space comprises: calculating a hydraulic conductivity value at each voxel on the medial surface; calculating a pressure field based at least in part on the local hydraulic conductivity at each voxel on the medial surface; calculating the total flow rate at a bottom solid boundary of the medial surface based at least in part on the assigned hydraulic conductivity value and calculated pressure field; and calculating the absolute permeability based at least in part on the calculated total flow rate at the bottom solid boundary of the medial surface and an applied pressure difference across the porous material or medium.

In some embodiments of characterizing fluid flow through a three-dimensional porous material or medium, calculating the absolute permeability of the porous material or medium based at least partially on the extracted medial surface of the void space is determined according to:

$$k = -\frac{Q\mu L}{A\Delta P} \quad (7)$$

wherein k is the absolute permeability of the porous material or medium, Q is the total flow rate at a bottom solid boundary of the medial surface, μ is the fluid viscosity, L is a length of the porous material or medium, A is a cross-sectional area of the porous material or medium, and ΔP is an applied pressure difference across the porous material or medium.

In some embodiments of characterizing fluid flow through a three-dimensional porous material or medium, the method comprises simulating multiphase drainage of the porous material or medium, said simulating comprising utilizing the extracted medial surface of the void space of the porous material or medium as a solution domain for determining fluid flow through the porous material or medium. In some embodiments, simulating a drainage simulation further comprises: assigning an entry capillary pressure to each voxel of said medial surface; increasing a pressure of a non-wetting phase reservoir until said non-wetting phase reservoir pressure exceeds the entry capillary pressure of voxels connected to the non-wetting phase reservoir; and determining the wetting phase saturation at incrementally increasing non-wetting phase pressures above said entry capillary pressure of voxels connected to the non-wetting phase reservoir. In some embodiments, assigning an entry capillary pressure to each voxel of said medial surface comprises computing the entry capillary pressure for each voxel according to:

$$P^c = (1.5\sigma \cos(\Theta))/r \quad (8)$$

wherein $P^c$ is the entry capillary pressure of the medial surface voxel, Θ is the contact angle of the medial surface voxel, σ is the surface tension of the medial surface voxel, and r is the distance between the medial surface voxel and the closest solid boundary. In some embodiments, determining the wetting phase saturation at incrementally increasing non-wetting phase pressures above said entry capillary pressure of voxels connected to the non-wetting phase reservoir comprises: computing the wetting phase saturation at each pressure difference according to:

$$S^w = \frac{\Sigma_i r_i}{\Sigma_j r_j} \quad (9)$$

wherein $S^w$ is the wetting phase saturation, r is the minimum distance between each voxel of the medial surface and a closest solid boundary, i=1, . . . , I, wherein I is the number of medial surface voxels occupied by the wetting phase, and j=1, . . . , J, wherein J is the total number of voxels on the medial surface.

In some embodiments of characterizing fluid flow through a three-dimensional porous material or medium, the method comprises simulating multiphase imbibition of the porous material or medium, said simulating comprising utilizing the extracted medial surface of the void space of the porous material or medium as a solution domain for determining fluid flow through the porous material or medium. In some embodiments, simulating an imbibition simulation further comprises: assigning an entry capillary pressure to each voxel of said medial surface; starting at a pressure difference between a non-wetting phase reservoir pressure and a wetting phase reservoir pressure that corresponds to about a zero percent saturation of a wetting phase, decreasing the pressure of the non-wetting phase reservoir; and determining the wetting phase saturation at incrementally decreasing non-wetting phase pressures. In some embodiments, assigning an entry capillary pressure to each voxel of said medial surface comprises computing the entry capillary pressure for each voxel according to $P^c = (1.5\sigma \cos(\Theta))/r$, wherein $P^c$ is the entry capillary pressure of the medial surface voxel, Θ is the contact angle of the medial surface voxel, σ is the surface tension of the medial surface voxel, and r is the distance between the medial surface voxel and the closest solid boundary. In some embodiments, determining the wetting phase saturation at incrementally increasing non-wetting phase pressures above said entry capillary pressure of voxels connected to the non-wetting phase reservoir comprises: computing the wetting phase saturation at each pressure difference according to:

$$S^w = \frac{\Sigma_i r_i}{\Sigma_j r_j} \quad (9)$$

wherein $S^w$ is the wetting phase saturation, r is the minimum distance between each voxel of the medial surface and a closest solid boundary, i=1, . . . , I, wherein I is the number of medial surface voxels occupied by the wetting phase, and j=1, . . . , J, wherein J is the total number of voxels on the medial surface.

In some embodiments of the presently-disclosed subject matter, a method for designing a three-dimensional porous material or medium with target properties is disclosed. In some embodiment, the method comprises: receiving an image of a random, three-dimensional porous material or medium configured to be disposed in a fluid flow-path, said porous material or medium comprising a void space; extracting a medial surface of the void space of the porous material or medium; utilizing the extracted medial surface of the void space of the porous material or medium as a representative geometry of the porous material or medium; calculating the pore size distribution of the void space of the porous material or medium based on the extracted medial surface of the void space; and calculating an absolute permeability of the porous material or medium based at least partially on the extracted medial surface of the void space. Thus, methods for designing a three-dimensional porous material or medium with target properties first uses the PTM to find a medial surface of the void space. Then, the medial surface is manipulated to find a material that either targets a statistical descriptor or a target effective property. First, the material is designed to have a target pore size distribution. Then, a similar medial surface manipulation is also explored for creating a material with a target permeability.

In some embodiments of a method for designing a three-dimensional porous material or medium with target properties, the method comprises receiving an image of a three-dimensional porous material or medium configured to be disposed in a fluid flow-path. In embodiments, an image can be a virtual image or a digital image, which is often composed of digital representations of a three-dimensional porous material or medium. The virtual or digital representation of a porous material or medium, or the extracted medial surface therefrom, is in the often described in terms of identifying or manipulating these objects or shapes. Thus, in embodiments, such manipulations are virtual manipulations, and can be accomplished in the memory or other circuitry/hardware of a computer system, or as a non-transitory computer readable medium storying computer program instructions to be executed on a processor of a computer system. In certain embodiments, the image is a binary image. In other embodiments, the image is a voxelized binary image. In further embodiments, the image is a mesh binary image.

In some embodiments of a method for designing a three-dimensional porous material or medium with target properties, the method comprises extracting a medial surface of the void space of the porous material or medium, as described previously.

In some embodiments of a method for designing a three-dimensional porous material or medium with target properties wherein the image of the three-dimensional porous material or medium comprises a voxelized binary image of the porous material or medium, the extracted medial surface is a voxel-wide medial surface. In some embodiments, a pore of the extracted medial surface is defined as a voxel-wide square prism, wherein the voxel-wide square prism is centered at each voxel of the medial surface and perpendicular to the medial surface at said voxel. However, it should be understood that the instantly-disclosed PTM is not limited to voxelized medial surfaces as the representative geometry and solution domain in porous media characterization, modeling, and design, and any medial surface can work. For example, a mesh-based approach (i.e., a medial surface with a mesh) or a curved surface approach can be utilized.

In some embodiments of a method for designing a three-dimensional porous material or medium with target properties wherein said image of the three-dimensional porous material or medium comprises a voxelized binary image of the porous material or medium, calculating the pore size distribution comprises calculating the mean and standard deviation of the pore size distribution of the extracted medial surface of the random, three-dimensional porous material or medium. In some embodiments, the method further comprises modifying a pore size distribution on the extracted medial surface of the random, three dimensional porous material or medium to create a modified medial surface with a target pore size distribution, wherein modifying a pore size distribution comprises adjusting the pore size distribution of the extracted medial surface to a normal distribution, said normal distribution comprising a mean and a standard deviation of σ target normal pore size distribution, and reconstructing a porous material or medium from the modified medial surface having a target normal pore size distribution.

In some embodiments of a method for designing a three-dimensional porous material or medium with target properties wherein said image of the three-dimensional porous material or medium comprises a voxelized binary image of the porous material or medium, calculating the pore size distribution comprises calculating the mean and standard deviation of the pore size distribution of the extracted medial surface of the random, three-dimensional porous material or medium. In some embodiments, the method further comprises: calculating a hydraulic conductivity value at each voxel on the medial surface; calculating a pressure field based at least in part on the local hydraulic conductivity at each voxel on the medial surface; calculating the total flow rate at a bottom solid boundary of the medial surface based at least in part on the calculated hydraulic conductivity value and calculated pressure field; and calculating the absolute permeability based at least in part on the calculated total flow rate at the bottom solid boundary of the medial surface and an applied pressure difference across the porous material or medium. In some embodiments, the method further comprises: In some embodiments, the method further comprises computing the pore size change ratio according to:

$$a = \min((k_{target}/k)^{1/3}, 2) \tag{10}$$

wherein a is the pore size change ratio, $k_{target}$ is a target absolute permeability, and k is the absolute permeability of the porous material or medium; updating the extracted medial surface of the void space of the porous material or medium to create a modified medial surface with a target absolute permeability; and reconstructing a porous material or medium from the modified medial surface having a target absolute permeability.

In some embodiments of a method for designing a three-dimensional porous material or medium with target properties, calculating the absolute permeability of the porous material or medium based at least partially on the extracted medial surface of the void space comprises determining the absolute permeability according to:

$$k = -\frac{Q\mu L}{A\Delta P} \tag{6}$$

wherein k is the absolute permeability of the porous material or medium, Q is the total flow rate at a bottom solid boundary of the medial surface, μ is the fluid viscosity, L is a length of the porous material or medium, A is a cross-sectional area of the porous material or medium, and ΔP is an applied pressure difference across the porous material or medium. In some embodiments, the method further comprises computing the pore size change ratio according to:

$$a = \min((k_{target}/k)^{1/3}, 2) \tag{10}$$

wherein a is the pore size change ratio, $k_{target}$ is a target absolute permeability, and k is the absolute permeability of the porous material or medium; updating the extracted medial surface of the void space of the porous material or medium to create a modified medial surface with a target absolute permeability; and reconstructing a porous material or medium from the modified medial surface having a target absolute permeability.

EXAMPLES

The following examples are given by way of illustration and are in no way intended to limit the scope of the present invention.

Example 1

Modified MLSEC-ST, a Medial Surface Extraction Algorithm

Figure 1B:
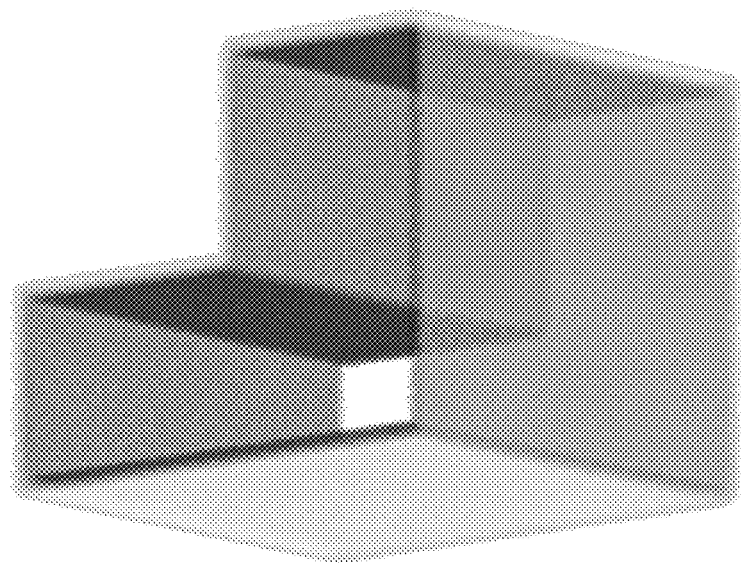

Several approaches have been proposed to extract a voxel-wide medial surface of a 3-D object, mostly based on iterative thinning of an energy map; one example is distance maps. We utilized the previously developed Multilocal Level-Set Extrinsic Curvature based on the Structure Tensor (MLSEC-ST). MLSEC-ST is a non-iterative analytical approach that is shown to be less sensitive to noise, have higher reconstructive power compared to other available algorithms and produce surfaces that closely satisfy the conditions of an ideal medial surface. We have modified the last step of the algorithm, Medial Surface Thinning, to ensure full connectivity in the final medial surface. A detailed description of the modified MLSEC-ST algorithm applied to a simple prism (FIG. 1A-B) is given below.

Figure 10A:
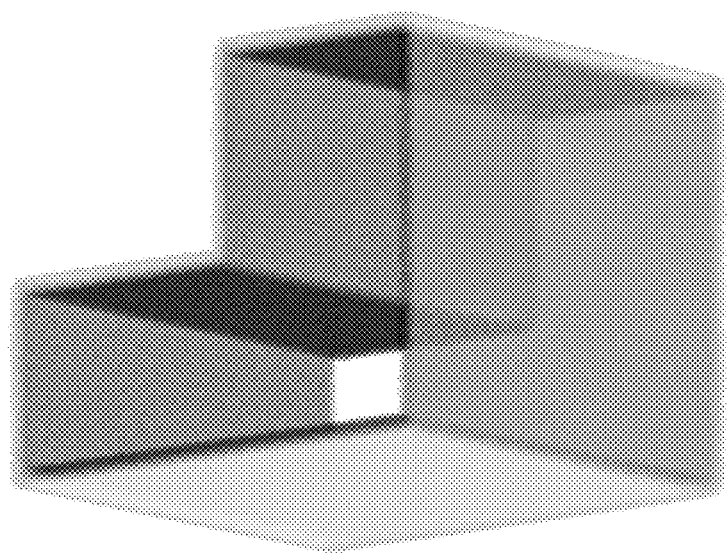

In this example, we demonstrate this medial surface extraction algorithm on a simple, constant cross-section prism shown in FIG. 10A.

Step 1: Obtain a Binary Image of Porous Media

Since the medial surface extraction algorithm described here is a voxel-based approach, obtaining a voxelized binary image of porous media is essential. Binary images for porous materials can be obtained either by using 3-D imaging of actual materials, or by using commercial packages like GeoDict. In the binary image shown in FIG. 10B, we labeled voxels of the solid matrix as one, and of void space as zero.

Step 2: Generate Euclidean Distance Map (D)

From the binary image of the porous medium, we generate the distance map inside the void space. Distance map D, also known as distance field or distance transform, is a representation of a digital image based on the distance between each voxel and the closest boundary (solid phase). Assuming solid voxels (1-value voxels) as boundary voxel, the distance map of the void space can be generated by computing the distance between each void voxel and the closest solid voxel. FIG. 11 shows the distance map of the sample prism.

Step 3: Compute Gradient of Distance Map

The gradient of distance map can be computed by convolving the distance map with gradients of Gaussian kernel:

$$\nabla D = (\partial_x D_\sigma, \partial_y D_\sigma, \partial_z D_\sigma) = (\partial_x g_\sigma * D, \partial_y g_\sigma * D, \partial_z g_\sigma * D) \quad (1)$$

where $\partial_x g_\sigma$, $\partial_y g_\sigma$ and $\partial_z g_\sigma$ are partial derivatives of the Gaussian kernel g with standard deviation of $\sigma$ and * is the convolution operator. To avoid over-smoothing we used 3×3×3 voxels window kernels with $\alpha$=0.5.

Step 4: Compute Structure Tensor (ST)

The structure tensor (ST) summarizes the dominant directions of the gradients in a neighborhood of each voxel, and is derived from the gradient field of a function. Smoothed ST at each voxel can be computed as $$ST_{\rho,\sigma}(D) = \begin{pmatrix} g_\rho * \partial_x D_\sigma^2 & g_\rho * \partial_x D_\sigma \partial_y D_\sigma & g_\rho * \partial_x D_\sigma \partial_z D_\sigma \\ g_\rho * \partial_y D_\sigma \partial_x D_\sigma & g_\rho * \partial_y D_\sigma^2 & g_\rho * \partial_y D_\sigma \partial_z D_\sigma \\ g_\rho * \partial_z D_\sigma \partial_x D_\sigma & g_\rho * \partial_z D_\sigma \partial_y D_\sigma & g_\rho * \partial_z D_\sigma^2 \end{pmatrix} \quad (2)$$

where $g_\rho$ is a 3×3×3 Gaussian kernel with standard deviation of $\rho$. Here we chose p=1.

Step 5: Find Principal Eigenvectors

ST is a positive definite tensor, therefore it has three non-negative eigenvalues for a 3D problem. For this case, since we have built the structure tensor from the gradients of the distance map, the eigenvectors at each voxel are the directions of principal gradients of distance map at the neighborhood of that voxel. To find the direction of the maximum gradient at each voxel, one needs to find the principal eigenvector of ST (i.e. the eigenvector corresponding to the maximum eigenvalue) at that voxel. For the sample prism of FIG. 10A, the 2-D view of the principal eigenvector field (V) is shown in FIG. 12.

Step 7: Compute Normalized Ridge Map (NRM)

Since the magnitude of all vectors in V is less than or equal to one, taking the divergence of V will assign a value between −N and +N to each voxel, where N is the dimension of the problem. For a 3-D geometry, this value will be bounded between −3 and +3. We will refer to this value as the normalized ridge map (NRM). Positive NRMs correspond to ridge voxels, and negative to valley voxels, therefore the magnitude of NRM value represents the degree of ridgeness or valleyness. NRM can be calculated as $$NRM = \text{div}(V) \quad (4)$$

A 2-D view of NRM for the sample prism is shown in FIG. 14. For the purpose of medial surface extraction, we are only interested in ridges (positive NRMs), therefore non-positive values can be ignored at the end of this step.

Step 8: Medial Surface Thinning: Hessian-Based Non-Maxima Suppression

The last step is to apply a thinning algorithm on the positive NRM values to extract a voxel wide medial surface. One of the most common thinning algorithms is non-maxima suppression (NMS). In NMS, one first needs to find a suppression direction, which is the direction perpendicular to the medial surface. The common practice is to use the direction of principal gradient of the NRM at each voxel as the suppression direction. It should be noted that the direction of principal gradient of NRM is the principal eigenvector of the structure tensor of NRM. However, it has been shown that implementing NMS on NRM map will introduce holes (disconnectivities) in the medial surface. Although this drawback can be ignored in many image processing cases, for our application it will change the connectivity of the void space of the porous media, which is undesirable. To overcome this drawback, we propose a modified NMS algorithm based on using the direction of maximum curvature of NRM as the suppression direction. The direction of maximum curvature of NRM is the principal eigenvector of Hessian tensor of NRM. Hessian matrix is a symmetric matrix that summarizes the dominant directions of curvatures at a neighborhood of a voxel. Instead of using the structure tensor of NRM, modified NMS uses the Hessian tensor of NRM map to find the suppression direction. Throughout this paper we will refer to this non-maxima suppression method as the Hessian-based Non-Maxima Suppression (HNMS).

In HNMS, the principal eigenvector of Hessian tensor of NRM at each point is chosen as the suppression direction. We computed the Hessian matrix at each voxel as below:

$$H_{\rho,\sigma}(NRM) = \begin{pmatrix} \partial_{xx} g_\rho * NRM & \partial_{xy} g_\rho * NRM & \partial_{xz} g_\rho * NRM \\ \partial_{yx} g_\rho * NRM & \partial_{yy} g_\rho * NRM & \partial_{yz} g_\rho * NRM \\ \partial_{zx} g_\rho * NRM & \partial_{zy} g_\rho * NRM & \partial_{zz} g_\rho * NRM \end{pmatrix} \quad (5)$$

where $\partial_{x_i x_j} g_\rho$ is the second derivative of the Gaussian kernel with respect to coordinates $x_i$ and $x_j$, and $\rho$=1. Let $V_{HNMS}$ be the principal eigenvector of the Hessian matrix at each voxel. The non-maxima suppression can be computed as $$NMS(x, y, z) = \quad (6)$$
$$\begin{cases} 1 & \text{if } NRM(x, y, z) > \max\{NRM(V_{HNMS}^+), NRM(V_{HNMS}^-)\} \\ 0 & \text{otherwise} \end{cases}$$

where $NRM(V_{HNMS}^+)$ and $NRM(V_{HNMS}^-)$ are NRM values in the immediate neighborhood of a voxel in the direction of $V_{HNMS}$.

FIG. 15 shows the suppression directions in the proposed Hessian-based NMS. It should be noted that the ideal suppression direction should be perpendicular to the medial surface. Finally, FIG. 16A-B shows 2-D and 3-D views of the extracted medial surface for the sample prism, respectively.

Example 2

Absolute Permeability Calculation

To compute absolute transverse permeability, we assumed a steady-state, laminar, single-phase flow through the void space of porous medium. To compute the fluid pressure (P) distribution inside the void space, we solved the following equation on the medial surface using the finite volume method:

$$\nabla \cdot (K_{local} \nabla P) = 0 \quad (11)$$

where $K_{local}$ is the local hydraulic conductivity at each voxel of the medial surface. To determine $K_{local}$, we assumed that single-phase flow at each voxel was influenced mainly by its nearest solid walls, and therefore used the Poiseuille equation for flow between parallel plates. To test the validity of the planar flow assumption, we computed hydraulic conductivities for a set of prisms with polygonal cross-sections and compared the result with exact solutions (discussed below).

Note that for each voxel, all 26 neighboring voxels should be included in discretizing Eqn (11) (see detailed discretization, discussed below).

Solving the Navier-Stokes equation for single-phase, steady state, fully developed, laminar, pressure-driven flow between two parallel plates, we obtained the following expression for the local hydraulic conductivity at each voxel:

$$K_{local} = \tfrac{2}{3}(br^3/\mu) \quad (12)$$

where $\mu$ is the fluid viscosity, b is the voxel size and r is the distance between the medial surface voxel and the closest solid boundary. The boundary conditions for Eqn (12) are similar to FIG. 2, but with reservoirs replaced with two non-equal wetting phase pressure conditions.

From the pressure field inside the void space, the flow rate can be calculated at the boundary of the porous medium:

$$Q = \Sigma_{boundary\ voxels} \left( -K_{local} \frac{\partial P}{\partial x} \right) \quad (13)$$

The absolute permeability k can then be calculated as $$k = -\frac{Q\mu L}{A\Delta P} \quad (7)$$

where L is the length of porous medium, $A = w_1 \times w_2$ (FIG. 2) is cross-sectional area, and $\Delta P$ is the applied pressure difference across the medium.

Validity of the planar flow assumption: To test the validity of the planar flow assumption in computing local conductivities in Eqn (12), we computed hydraulic conductivities for a set of prims with polygonal cross-sections using the PTM permeability calculation algorithm and compared the result with exact solutions derived by Mortensen et al. (2005). We followed the procedure outlined above, but instead of Eqn (7), we used the following expression for the hydraulic conductivity K of the prism:

$$K = -\frac{QL}{\Delta P} \quad (14)$$

Figure 17:
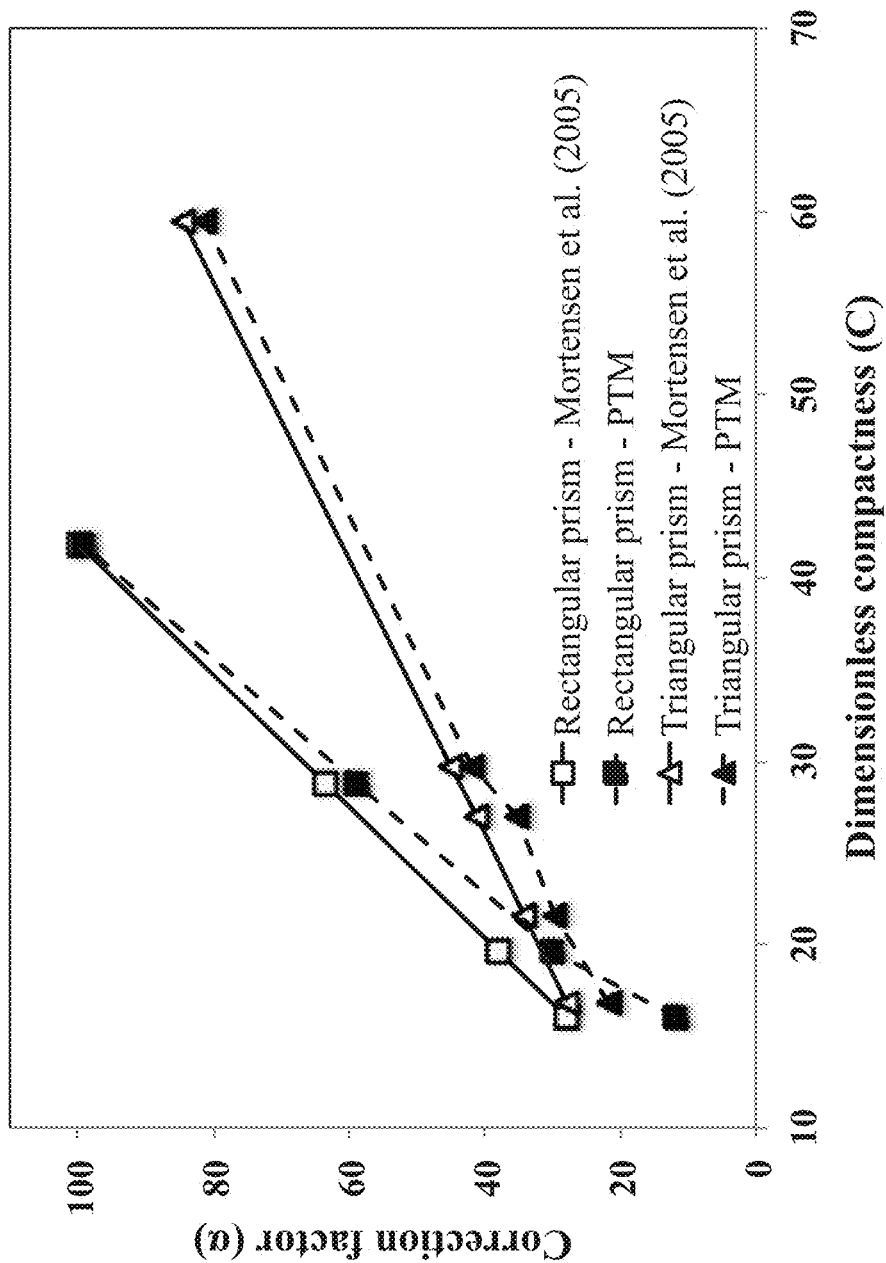
FIG. 17 depicts the correction factor vs. dimensionless compactness for triangular and rectangular prisms.
Figure 18A:
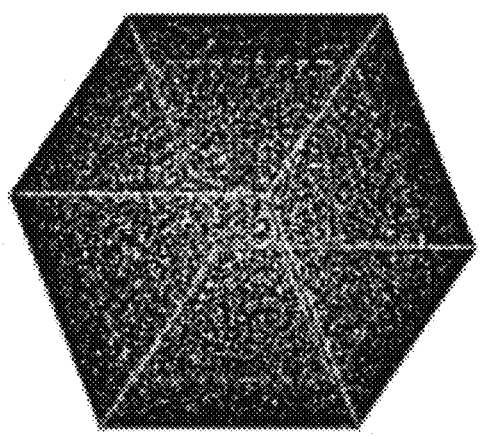
FIG. 18A-18F depicts example of a porous medium generated using level-cut Poisson field method with $r_x=8.3$ $r_y=3.1$, $r_z=3.1$, $A=6.9315*10^-4$, $\alpha=1$. Domain D and D' are represented as dashed and solid cubes, respectively.
Figure 18B:
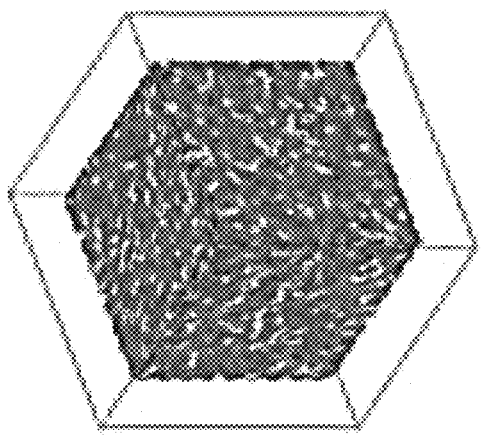
Figure 18C:
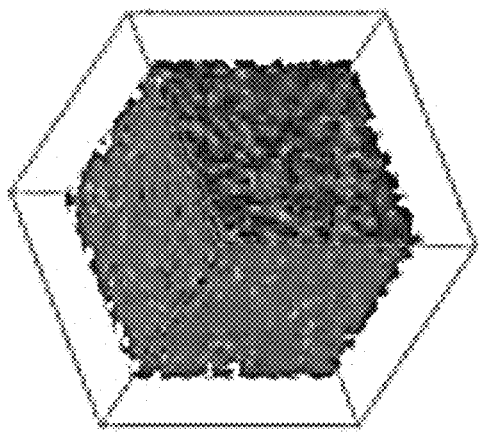
Figure 18D:
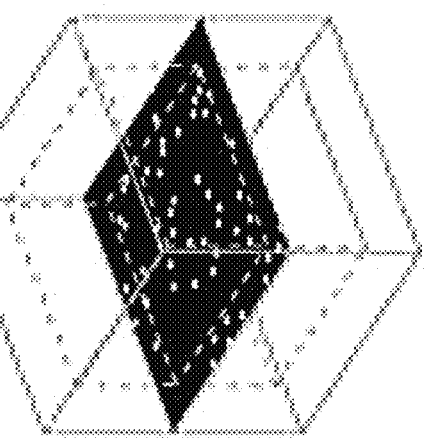
Figure 18E:
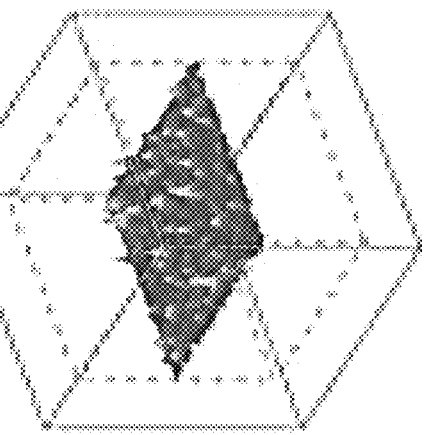
Figure 18F:
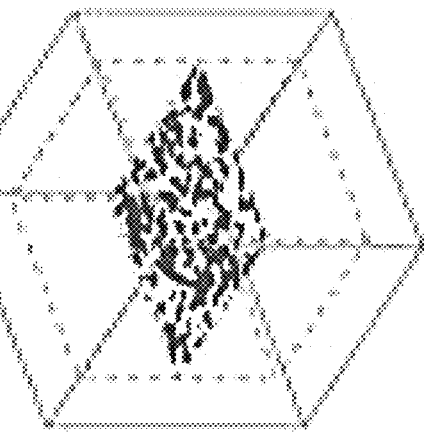

As in Mortensen et al. (2005), we defined the dimensionless hydraulic resistivity or correction factor $\alpha$, and dimensionless compactness C, to represent our results. These parameters can be computed as follows:

$$\alpha = \frac{A^2}{K\mu} \quad (15)$$

$$C = \frac{p}{A^2} \quad (16)$$

where A and p are the cross-sectional area and cross-sectional perimeter of the prism, respectively; K is hydraulic conductivity, and $\mu$ is fluid viscosity. FIG. 17 compares the PTM results with exact values for $\alpha$ and C computed in Mortensen et al. (2005), for rectangular and triangular prisms. As the compactness increases, the PTM results approaches the exact solution, which is consistent with our assumption of flow between parallel plates for all voxels on medial surface.

Detailed discretization: As mentioned previously, to find the pressure field inside the void space, the following equation is discretized and solved on the medial surface of the void space:

$$\nabla \cdot (K_{local} \nabla P) = 0 \quad (17)$$

where $K_{local}$ is the local hydraulic conductivity at each voxel of the medial surface, and its value is zero on all non-medial surface voxels in the porous media domain.

Since we are aiming to discretize and solve this equation only on the medial surface, we have used a modified version of the well-known central differencing scheme used in finite volume method (FVM).

Following the finite volume approach, we start the discretization by taking the integral of both sides of equation (17) over the volume of a voxel (V).

$$\int_V \nabla \cdot (K_{local} \nabla P) dV = 0 \quad (18)$$

Then, using the divergence theorem, we can change the above volume integral to a surface integral:

$$\int_S (K_{local} \nabla P) \cdot n\, dS = 0 \quad (19)$$

So far, we have followed the exact procedure that one would take in FVM. Then, instead of using the six faces of our cubic voxels as our integration surfaces, we assumed an imaginary rhombicuboctahedronan with 26 equal-area faces. Using this analogy, instead of three gradient directions, we will have 13 directions:

$$\sum_{i=1}^{13} \left[ \left[ K_{local} \frac{\partial P}{\partial n_i} \right]_{i^+} - \left[ K_{local} \frac{\partial P}{\partial n_i} \right]_{i^-} \right] = 0 \quad (20)$$

where $n_i$ is the gradient direction and $i^+$ and $i^-$ shows the opposite faces along the gradient direction. This assumption is essential in capturing all curvatures and the junctions that are present in the voxel-wide medial surface. Further simplification of Eqn (20) will result:

$$\Sigma_{i=1}^{13} = [[(K_{local,i+1} + K_{local,i})(P_{i+1} - P_i)]\text{sign}(K_{local,i+1}) - [(K_{local,i} + K_{local,i-1})(P_i - P_{i-1})]\text{sign}(K_{local,i-1})] = 0 \quad (21)$$

In Eqn (21), sign(.) is used to automatically zero out the gradient between a medial surface voxel and a non-medial surface voxel.

Example 3

Relative Permeability Calculation (Wetting Phase)

Step 1. Assign an entry capillary pressure ($P_{entry}^c$) to each voxel on the medial surface using Eqn. (5).
Step 2. Set the top boundary condition as varying non-wetting phase reservoir pressure of $P^{nw}$ and bottom boundary as constant wetting-phase reservoir pressure of $P^w$. All other sides have no-flux boundary conditions.
Step 3. Let N=0. Set $P_0^{nw} \gg P^w$ (corresponding to $S_0^w$=0%). Label all medial surface voxels as "non-wetting" voxels.
Step 4. N=N+1. Slightly decrease non-wetting phase pressure ($P_N^w$). At this pressure, the wetting phase can occupy voxels connected to the wetting phase reservoir, if $\Delta P_N = P_N^{kw} - P^w < P_{entry}^c$. Label these voxels as "wetting". Compute wetting phase saturation $S_N^w$ using $$S_k^w = \frac{\sum_i r_i}{\sum_j r_j} \quad (6)$$

where i=1, . . . , I where I is the number of medial surface voxels occupied by wetting phase, and j=1, . . . , J where J is the total number of voxels on medial surface. Store $\Delta P_N = P_N^{nw} - P^w$ and $S_N^w$.
Step 5. Check if the cluster of wetting phase voxels span the whole length of the porous medium.
  a. If yes, input the wetting phase voxels cluster to absolute permeability algorithm and compute the permeability of the cluster (k'). Calculate relative permeability as $k_N^{rw} = k'/k_{abs}$, where $k_{abs}$ is the absolute permeability of wetting phase in the sample. Store $\Delta P_N = P_N^w - P^{nw}$, $S_N^w$ and $k_N^{r,w}$.
  b. If not, $k_N^{r,w}$=0. Store $\Delta P_N = P_N^w - P^{nw}$, $S_N^w$ and $k_N^{r,w}$.
Step 6. If there are still non-wetting phase voxels that are connected to both reservoirs, go to step 4. Otherwise stop the algorithm.

Example 4

Quasi-Static Drainage and Imbibition

The Young-Laplace equation states that capillary pressure difference across the interface of two static fluids $P^c$ is a function of surface tension a and the mean curvature of the interface H:

$$P^c = \sigma H = \sigma \left( \frac{1}{R_1} + \frac{1}{R_2} \right) \quad (22)$$

where $R_1$ and $R_2$ are the principal radii of curvature of the interface. For a finite, positive $P^c$, one can identify two opposite cases: (i) the spherical interface case, where $R_1=R_2=R$ and therefore $$P^c = \frac{2\sigma}{R};$$

and (ii) the cylindrical interface case, where $R_1=R$ and $R_2=\infty$ and, therefore, $$P^c = \frac{\sigma}{R}.$$

In reality, quasi-static interfaces span over this range. Here, we use the average $P^c$ of these two cases to approximate the entry capillary pressure at each voxel of the medial surface, yielding $$P^c = \frac{1.5\sigma}{R}.$$

Assuming that the smallest radius of curvature R is related to contact angle θ through $$R = \frac{r}{\cos(\theta)},$$

where r is the distance between the medial surface voxel and the closest solid boundary, we obtain:

$$P^c = \frac{1.5\sigma \cos(\theta)}{r} \quad (8)$$

To test the validity of this assumption, we compared our drainage and imbibition results for prisms with triangular and rectangular cross-sections, with the analytical results of Mason and Morrow, 1991, with excellent agreement (not presented). To simulate quasi-static drainage and imbibition, medial surfaces of porous media samples were extracted from binary images as described previously in Example 1, and an entry capillary pressure $P_{entry}^c$ was assigned to each voxel on the medial surface using Equation (8). For the setup shown in FIG. 2, the percolation of wetting phase (imbibition) or non-wetting phase (drainage) was simulated. For drainage, the wetting phase reservoir pressure was assumed to be zero and initially equal to the pressure of the non-wetting phase reservoir. To initiate drainage, the non-wetting phase pressure was increased until it exceeded the entry capillary pressure of voxels connected to non-wetting phase reservoir. At this pressure, the non-wetting phase can occupy voxels connected to the non-wetting phase reservoir, if $P_{entry}^c < (P^{nw} - P^w)$, where $P^{nw}$ is the non-wetting phase reservoir pressure, and $P^w$ is the wetting phase reservoir pressure. The drainage simulation proceeded by increasing the non-wetting phase pressure in increments, checking for the abovementioned condition and propagating the non-wetting phase accordingly.

Imbibition simulation started from a large pressure difference ($P^{nw} - P^w$) corresponding to ~0% wetting phase saturation, and continued by decreasing the non-wetting phase pressure in increments. At each pressure difference, the wetting phase can occupy voxels connected to the wetting reservoir, if $P_{entry}^c > (P^{nw} - P^w)$. As evident from both drainage and imbibition algorithms, we assumed that no trapping occurred. We also ignored merging and splitting of interfaces.

For both drainage and imbibition, wetting phase saturation $S^w$ was computed at each pressure difference:

$$S^w = \frac{\sum_i r_i}{\sum_j r_j} \quad (9)$$

where r is the minimum distance between each voxel of the medial surface and nearby solid clusters, i=1, ..., I where I is the number of medial surface voxels occupied by wetting phase, and j=1, ..., J where J is the total number of voxels on medial surface. Alternatively, one can compute the saturation values by reconstructing the saturated 3-D void space from the medial surface voxels that are occupied by wetting phase during drainage and imbibition, albeit at a much higher computational time. Our numerical investigations (not presented), showed that despite its simplicity, equation (9) produced negligible error compared to the 3-D volume reconstruction approach.

Example 5

Results and Discussion for Examples 1-4

We implemented PTM on six isotropic homogenous fibrous materials with different porosities. Fibrous is referred to materials made from natural or synthetic fibers. All structures were generated using the GeoDict software package. Table 1 below summarizes the geometrical and physical parameters of virtual porous media used in this study. FIG. 3A-F shows a sample of fibrous material and its medial surface and FIG. 4A-F shows cross-sections of the virtual fibrous materials used in this study.

TABLE 1

Geometrical and physical parameters of porous media samples in GeoDict.

| Property | Value | Unit |
|---|---|---|
| Dimension | 2 × 2 × 0.8 (height) | mm |
| Porosity ($\varphi$) | 0.25, 0.5, 0.7, 0.8, 0.9, 0.95 | |
| Resolution | 4 | μm |
| Contact angle ($\theta$) | 55 | Degree |
| Surface tension ($\sigma$) | 0.0725 | N/m |
| Viscosity of wetting phase ($\mu$) | 0.001 | Pa · s |

Pore size distribution: Pore size distributions were computed in GeoDict and PTM for all material samples, using porosimetric and geometric methods (FIG. 5A-F). Porosimetric pore size distribution analysis is based on numerical modeling of the intrusion of a non-wetting fluid (mercury) into the void space of an air-occupied porous medium. GeoDict uses the Full Morphology (FM) method, and PTM—the drainage algorithm described in Example 4.

The geometric pore size distribution in GeoDict is obtained by fitting spheres into the void space of the porous structure. In PTM, each voxel of the medial surface is associated with a voxel-wide square prism with height of 2h, where h is the minimum distance between each voxel and nearby solid clusters. Each prism represents a pore. The volume fraction is then calculated similarly to Eqn (9).

FIG. 5 shows a rather critical problem associated with current pore-based methodologies such as pore network modeling and full-morphology: the definition of pore. Although characterizing the pores through sphere-fitting is an appropriate method for low porosity, non-fractured porous media, applying the same concept to highly porous materials, where high aspect ratio pores are abundant, is not reasonable. As shown in this figure, PTM pore size distributions closely match the trend of the GeoDict pore size distribution curves for low porosity media. But as the porosity increases, the discrepancy increases.

Another observation in FIG. 5A-F is the oscillations in the results of both GeoDict and PTM for higher porosity materials that are mostly due to the wider pore size distribution in these materials. Note that same resolution has been used for all cases. If we decrease the resolution, some of these oscillations will vanish.

Figure 6:
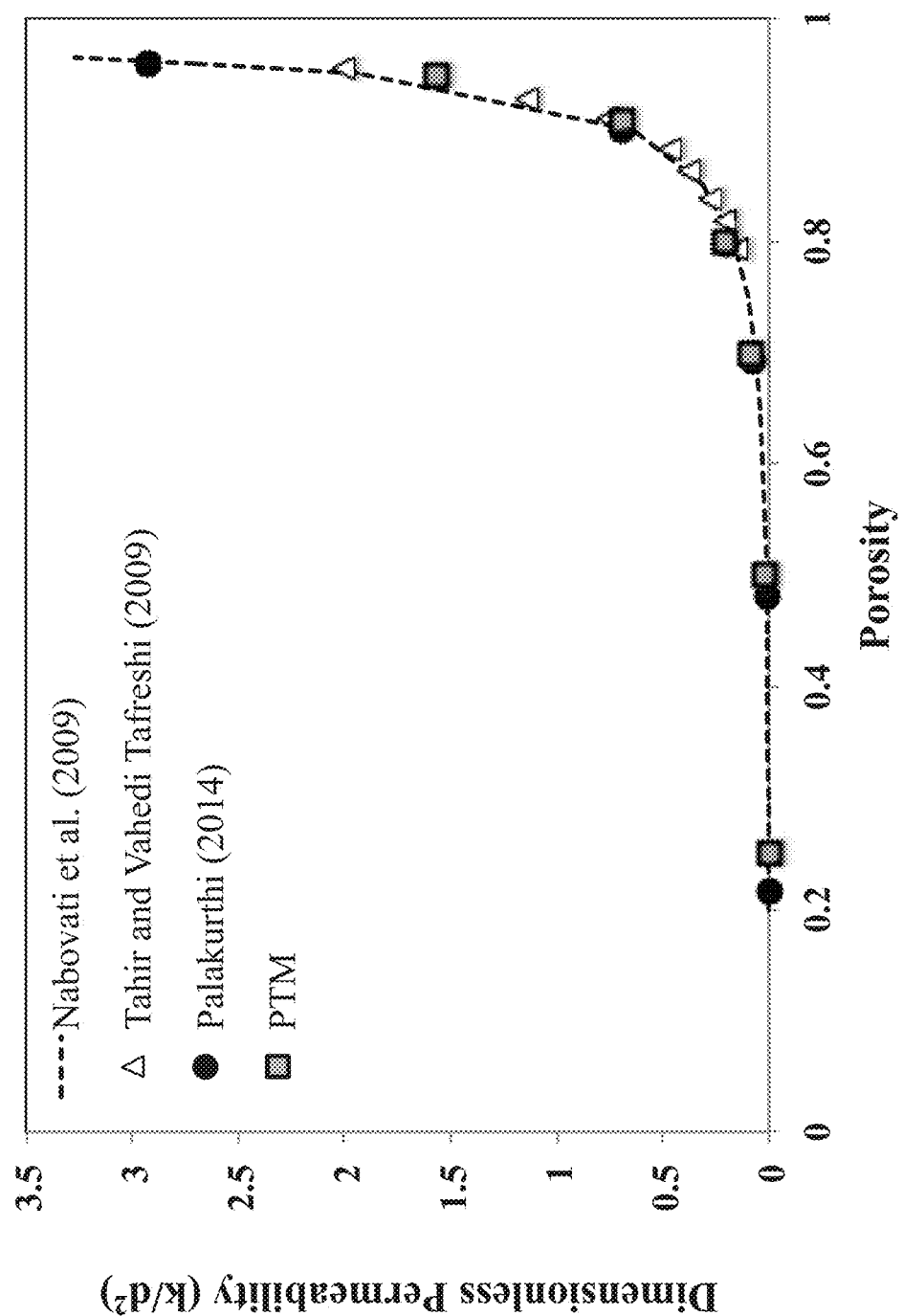
FIG. 6 depicts a graphical representation of absolute transverse permeability vs. porosity computed in PTM as compared to three other studies on isotropic fibrous materials.

Absolute permeability: FIG. 6 compares permeability computed in PTM with three other studies on isotropic fibrous materials. These works include that of Nabovati et al. (2009), in which they derived an empirical equation for absolute permeability of isotropic fibrous materials based on their Lattice Boltzmann simulation results; and works of Tahir and Vahedi Tafreshi (2009) and Palakurthi (2014), who performed finite volume method simulations with FLUENT and OpenFoam packages, respectively. PTM is in excellent agreement with these numerical results.

Figure 7A:
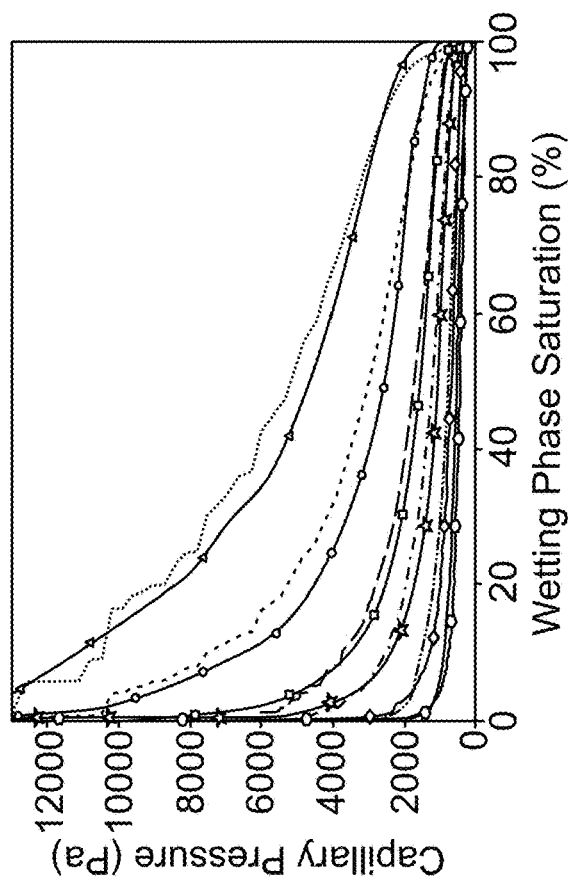
FIG. 7A-7B depicts capillary pressure-saturation curve for primary drainage (FIG. 7A), and imbibition (FIG. 7B) in six GeoDict samples.
Figure 7B:
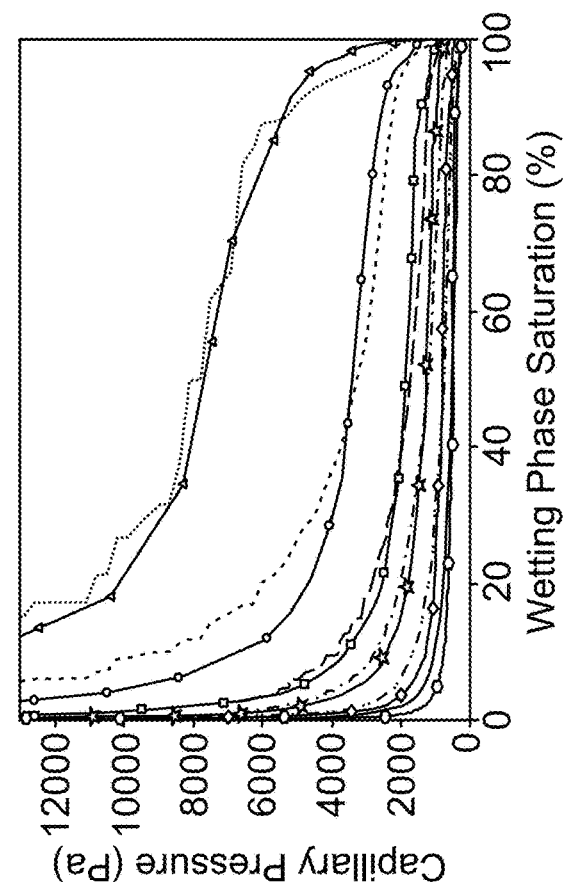

Quasi-static drainage and imbibition: FIG. 7A-B shows the capillary pressure—saturation curves for primary drainage and imbibition for all six fibrous material samples using PTM and FM. The FM simulations have been performed using the GeoDict software package. FM uses morphological operations to determine the flow (or open) paths inside the pore-space. The results are in very good agreement; errors range from 1.14% to 16.51%. The FM method produces drainage results comparable to the Lattice-Boltzmann method, and was chosen for comparison due to its low computational cost and ease of implementation. To capture small pores in samples of 25% and 50% porosity, we increased the resolution from 4 to 2 μm.

Figure 8:
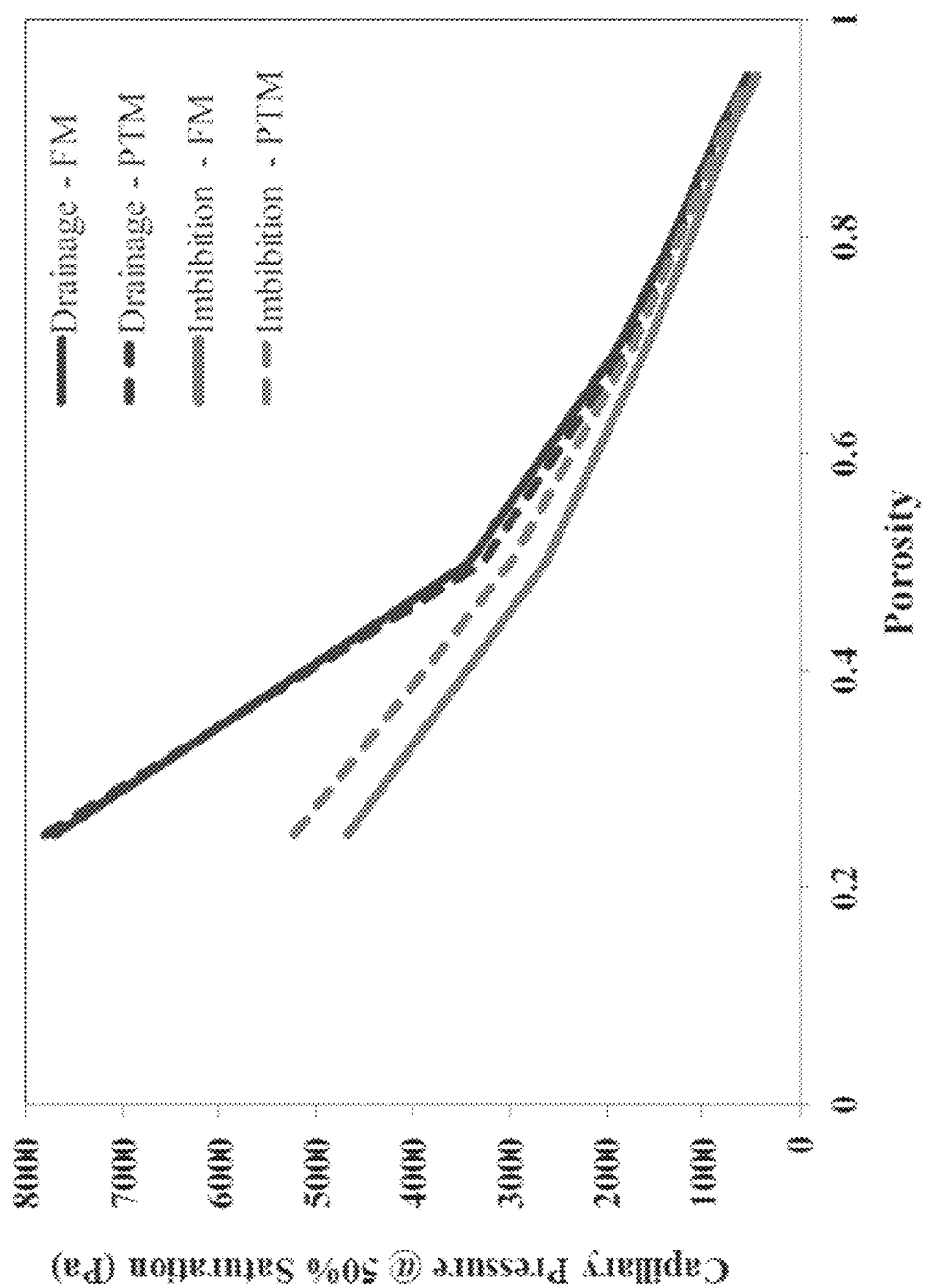
FIG. 8 depicts capillary pressure values at 50% saturation vs. porosity for drainage and imbibition.

The values of capillary pressure vs porosity at 50% saturation are shown in FIG. 8. This plot clearly shows that PTM results are in excellent agreement with FM, particularly for drainage. Note that Full Morphology method is known for its accuracy in drainage simulations, but not in imbibition. FIG. 8 also shows that PTM can capture the geometrical hysteresis that is present in capillary pressure-saturation curves.

Figure 9:
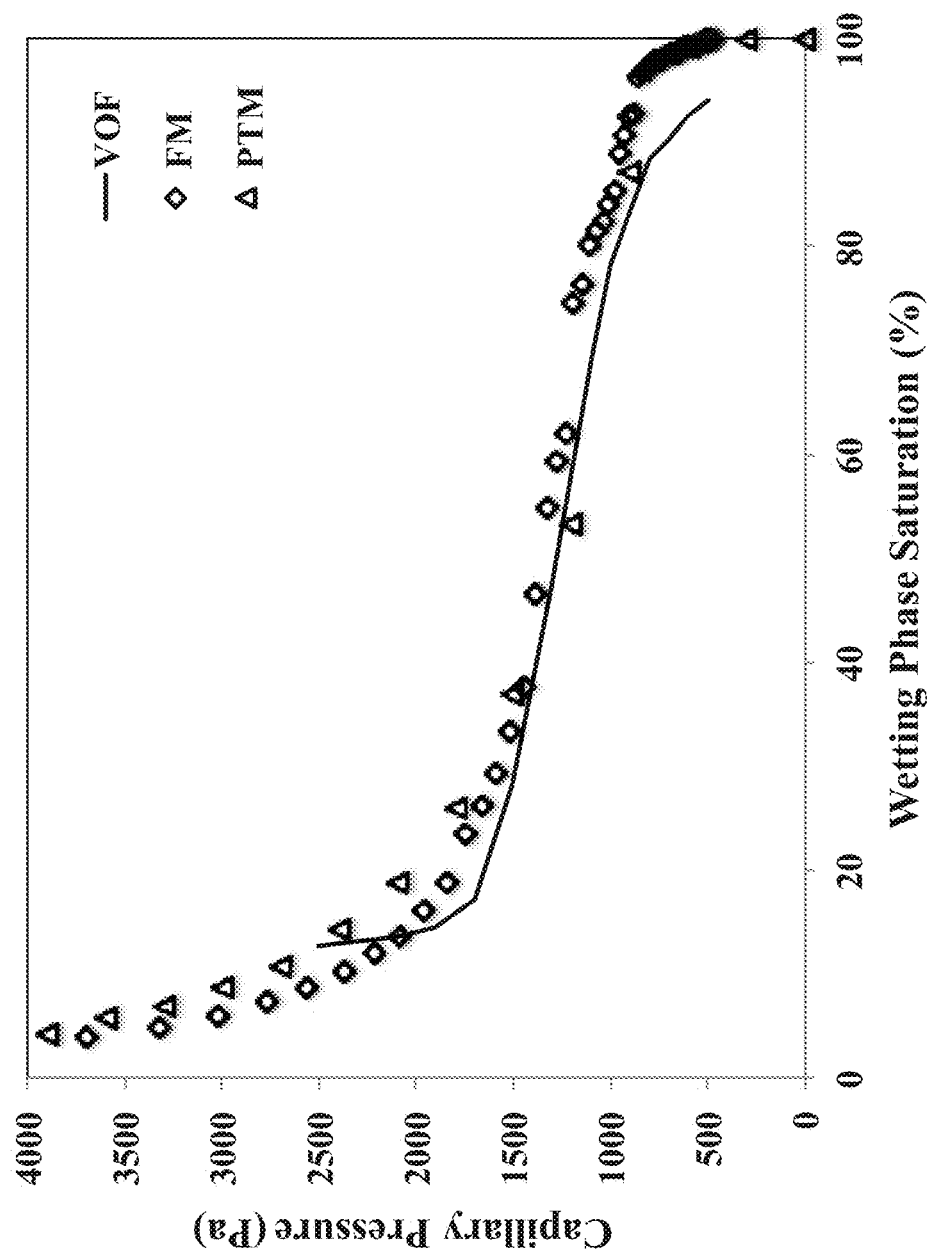
FIG. 9 depicts capillary pressure-saturation curve for primary drainage using volume of fluid (VOF), full morphology (FM) and pore topology method (PTM).

Finally, for a material of 80% porosity, we compared primary drainage curves generated with volume-of-fluid (VOF) (Palakurthi (2014)), FM and PTM (FIG. 9), with excellent agreement.

Discussion: This work was inspired by challenges in characterization and flow simulations in thin, highly porous media. Our goal was to develop a fast method for microscale modeling in thin, highly porous materials, but potentially applicable to porous materials with any porosity and void space geometry. In this study we probed the suitability of PTM as a possible candidate. Through numerical experiments presented here, we sought to answer two questions: i) does the medial surface of the void space extracted with PTM's modified MLSEC-ST algorithm, possess high reconstructive power, and, therefore, serve as a meaningful representative geometry for porous media? If yes, ii) can this geometry be directly used as the solution domain for multiphase flow simulations? Our results to date provide positive answers to both inquiries.

One way to assess how well a medial surface represents the structure of the void space is to estimate the statistical properties of the void space based on the information contained in the medial surface. FIG. 5A-F shows the geometric and porosimetric pore size distributions for all six materials, computed with GeoDict and PTM. Overall, both geometric and porosimetric pore size distribution curves derived via PTM follow the same trend and spectrum as those derived using GeoDict software package. The shift toward the lower pore sizes observed in PTM with respect to GeoDict results is due to differences in how pores are defined. In GeoDict, an inscribed sphere in the void space represents a pore. In PTM, on the other hand, a pore is defined as a voxel-wide square prism centered at each voxel on the medial surface and perpendicular to the medial surface at that voxel. PTM, therefore, would count more pores of smaller sizes. Despite these algorithmic differences, pore size distributions for all tested materials from low to high porosity yielded curves in the same range and of comparable values, lending confidence in the reconstructive power of the medial surfaces used in PTM.

The degree of fidelity of a medial surface to the structure of the void space can be further tested indirectly, through numerical simulations of multi-phase flow. We designed simple numerical experiments to implement percolation and to solve partial differential equations on medial surface. In particular, permeability calculations demonstrate that PTM accurately captures pore connectivity. Our results presented in FIGS. 5-9 demonstrate a good agreement with state-of-the art methods, and confirm that PTM's medial surfaces (1) have adequate reconstructive power; and (2) can be used directly as the solution domain for multiphase flow simulations.

Numerical experiments presented here were based on several simplifying assumptions and did not utilize all information that can potentially be contained in the medial surface. We searched for the interfaces using the contact angle and the distance to the closest solid wall. This strategy does not include interface stability conditions or trapping assumptions, and therefore may result in possible false detection of interfaces and may miss merging and splitting of interfaces. To find the exact location of quasi-static interfaces in capillary dominated flows, detailed geometry of the local cross-sections, the 3D orientation of surrounding solid walls, and the location of other interfaces will be included in the algorithm in the future.

Although the assumption of laminar, fully-developed flow between two parallel plates works well for sheet-like, high aspect ratio cross-sections, it may cause errors when low aspect ratio pores are dominant, typically for very low porosity media. Removing these limitations and relaxing the simplifying assumptions will likely result in higher reconstructive power of the medial surfaces. Again, more geometrical and topological information should be incorporated into the algorithms. Such information is inherent to the medial surface and its attributes such as the distance map. These steps will lead to more realistic assumptions in PTM formulation, and help extend its applicability to a wider range of porous media, including non-fibrous materials.

As the instantly-disclosed data demonstrates, the Pore Topology Method (PTM) is a fast, micro-scale modeling approach based on representing the void space of porous medium by its medial surface, and can be successfully used it as the solution domain for multi-phase flow computations. To validate PTM, we simulated quasi-static drainage and imbibition, and computed pore size distributions and absolute permeability for a set of isotropic fibrous materials of varying porosity. Our results are in very good agreement with several state-of-the-art methods such as lattice Boltzmann, full morphology, volume-of-fluid and finite volume methods, as well as analytical solutions.

Further, in comparison to the previous categories of approaches, direct numerical simulation (DNS) and pore network modeling (PNM), PTM results in higher computational efficiency and higher accuracy (Table 2). DNS uses the original volume of void space to simulate flow, while PNM converts porous media to a network of pore bodies—simple volumes such as spheres to represent the large void spaces, and pore throats—simple channels such as circular channels to represent the connection between pore bodies.

TABLE 2

Comparison of PTM to PNM and DNS.
Table 2. Flow simulation capabilities

| Methodology | Pore Network Modeling (PNM) | Direct Numerical Simulations (DNS) | Pore Topology Method (PTM) |
|---|---|---|---|
| RAM usage | Low | High | Medium |
| CPU time | Low | High | Low |
| Algorithmic complexity | Medium | High | Low |
| Accuracy | Medium for low porosity/ low for high porosity/ low for fractured media | High | High |

Compared to DNS, we have improved the computational time by converting the 3D volume to a 2D surface, while retaining the important spatial information. For instance, in our current case studies, the medial surface comprised only 10-20% of the void space volume voxels. This means that in theory, if both DNS and PTM use the voxels as the solution domain, PTM will be 80-90% faster. In reality, the difference is much larger, as PTM also uses simpler system of equations. Despite this, PTM results are in excellent agreement with the DNS results. PNM mainly suffers from its oversimplified poor representation of the 3D topology of the void space that leads to its limited use for simple low porosity structures and its low accuracy for other porous media. For instance, while PNM works relatively well for sand systems and granular porous media, it fails to provide a solution to flow characterization in highly porous fibrous materials as well as low porosity fractured media such as coal systems. However, for cases where PNM has a satisfactory performance, its computational time is slightly less than PTM. In summary, while PNM is faster, its application is limited to certain porous structures, while PTM method is applicable to all types of porous materials and medium.

Example 6

Creation of a Random Virtual Porous Material: Level-Cut Poisson Field Method

A virtual two-phase porous material can be fully defined by a binary matrix with one-voxels indicating solid space, and zero-voxels indicating void space. To create a random virtual porous material, the ones and zeros must be placed throughout the domain in such a way that the matrix resembles porous media.

The level-cut Poisson field method creates such random porous structures by placing ellipsoidal inclusions of arbitrary sizes and orientation throughout the domain, where the number and location of the inclusions are governed by the randomly distributed seeds in the domain. The final structure of the porous medium is governed by the following input parameters: seed density (λ) of the Poisson field, i.e. number of seeds per voxel, cut level (α), a constant value used to cut the Poisson field, and ($r_x$, $r_y$, $r_z$), constant values that determine the ratio of the ellipsoid dimensions. According to Grigoriu, 2003, the level-cut Poisson field method consists of the following 5 steps:

Step 1: Define $D' \in \mathbb{R}^{(l_1+\delta) \times (l_2+\delta) \times (l_3+\delta)}$, $D'(x, y, z) \in \{0,1\}$, where $l_1$, $l_2$ and $l_3$ are the dimensions of the target porous media $D \subset D'$, in voxels, and $\delta$ is a positive integer chosen to alleviate the boundary effects. Define $X \in \mathbb{R}^{(l_1+\delta) \times (l_2+\delta) \times (l_3+\delta)}$, $X(x, y, z) \in \{R \geq 0\}$.

Step 2: Generate a random integer N(D') using a Poisson distribution of $\lambda v_{D'}$ intensity, where $v_{D'}$ is the volume of D', in voxels.

Step 3: Place the N(D') seeds randomly throughout X. At this step, the homogeneity of the structure can be adjusted by altering the spatial distribution of seeds. A uniform distribution of seeds in X results in a homogenous structure.

Step 4: Generate a 3-D random Poisson field X (x, y, z) by summing randomly rotated multivariate Gaussian distributions centered at each seed. The value of each voxel in X can be calculated using $$X(x, y, z) = \sum_{i=1}^{N(D')} X_i \exp\left(-\left(\left(\frac{x_R}{r_x}\right)^2 + \left(\frac{y_R}{r_y}\right)^2 + \left(\frac{z_R}{r_z}\right)^2\right)\right) \quad (24)$$

where i is the seed number, $X_i = 10|N(0,1)|$ is the amplitude of the multivariate Gaussian distribution centered at the $i^{th}$ seed, $|N(0,1)|$ is the folded normal distribution with mean of 0 and standard deviation of 1, and ($x_R$, $y_R$, $z_R$) is the relative location of the voxel (x, y, z) to the location of the $i^{th}$ seed ($x_i$, $y_i$, $z_i$) after being rotated by a random rotation matrix R, calculated as $$\begin{bmatrix} x_R \\ y_R \\ z_R \end{bmatrix} = R \times \left(\begin{bmatrix} x \\ y \\ z \end{bmatrix} - \begin{bmatrix} x_i \\ y_i \\ z_i \end{bmatrix}\right), \quad (25)$$

$$R = \begin{bmatrix} 1 - 2q_3^2 - 2q_4^2 & 2(q_2q_3 - q_4q_1) & 2(q_2q_4 + q_3q_1) \\ 2(q_2q_3 + q_4q_1) & 1 - 2q_2^2 - 2q_4^2 & 2(q_3q_4 - q_1q_2) \\ 2(q_2q_4 - q_1q_3) & 2(q_3q_4 + q_1q_2) & 1 - 2q_2^2 - 2q_3^2 \end{bmatrix} \quad (26)$$

Where $q_1$, $q_2$, $q_3$, $q_4$ are 4 random numbers from a normal distribution. This uses quaternions to create a uniform random rotation matrix.

Step 5: Cut the 3D random field X (x, y, z) using the cut level α

$$D'(x, y, z) = \begin{cases} 0, & \text{if } X(x, y, z) \geq \alpha \\ 1, & \text{if } X(x, y, z) < \alpha \end{cases} \quad (27)$$

Where zero-voxels represent the void space and one-voxels represent the solid space. Finally, the domain D is extracted from D'.

In FIG. 18A-F, a 2-D cross section of a 3-D sample generated with the input parameters: $r_x$=8.3 $r_y$=3.1, $r_z$=3.1, λ=6.9315*10^−4, α=1 is shown. In this case, the seeds are placed uniformly, and the rotation of the Gaussian distributions is uniform as well. This makes an isotropic homogenous material.

Example 7

Medial Surface and Volume Reconstruction

The medial surface of the 3D volume is defined as the loci of center of the maximal spheres as they roll through the interior of the void space. Medial surface of an object offers its compact representation, while retaining sufficient local information to reconstruct the object fully and with high accuracy.

As described in Example 1, the medial surface of the void space of a porous material or medium can be extracted using the modified Multilocal Level-Set Extrinsic Curvature based on the Structure Tensor (MLSEC-ST). Once the medial surface of the void space is extracted, the weighted medial surface (M) can be generated by assigning a value r to each voxel on the medial surface, where r is equal to the distance between the medial surface voxel and the closest solid boundary.

One of the most important features of a medial surface is its reconstructive power. It has been shown that using the medial surface and its corresponding r distribution (weighted medial surface), one can fully reconstruct the original medium with a high accuracy. This can be achieved by placing a sphere of radius r at each voxel. To accelerate the process and avoid errors caused by limited voxel resolution, we propose the following algorithm:

Step 1. Create zero matrices of $C \in \mathbb{R}^{l_1 \times l_2 \times l_3}$ and $D \in \mathbb{R}^{l_1 \times l_2 \times l_3}$, where $l_1$, $l_2$ and $l_3$ are the dimensions of the porous medium.

Step 2. Given the weighted medial surface M, Find the unique weights (r values in voxels) on the medial surface. Store the unique values in vector R.

Step 3. For each value $R_i$ in R:
  d) Find the voxels in C that corresponds to the medial surface voxels weighted by R. Mark these voxels by one and all others by zero.
  e) Find the distance map of C, where each zero-voxel takes the value equal to the distance of that voxel to the closest one-voxel.
  f) Threshold C by $R_i-\beta$, where β is the relaxation factor used to relax resolution errors. As the result of thresholding, voxels in C with values larger than $R_i-\beta$ become zero and the rest become one. Update matrix D=D∪C.

Step 4. Find the logical negation of D (D=~D). Binary matrix D is the reconstructed porous structure, where one-voxels represent solid and zero-voxels represent void space.

Example 8

Design for Target Porosity

The porosity (φ) of a porous medium is defined as the ratio of void space volume to the total volume of the porous medium. To design a random porous structure with a certain target porosity ($\varphi_{target}$) using level-cut Poisson field method, one needs to iteratively adjust the cut level α so that the target porosity is achieved. In addition, as one changes the cut level, the size of the individual ellipsoidal inclusions is changed. Further, it requires high computational time and it is a trial and error process. To alleviate this drawback, an analytical relationship has been developed that relates the seed density ($\lambda$) to target porosity ($\varphi_{target}$), cut level ($\alpha$) and ellipsoid parameters ($r_x$, $r_y$, $r_z$) of the level-cut Poisson field method:

$$\lambda = \frac{-\ln(1 - \varphi_{target})}{\frac{\sqrt{2}}{3}\pi r_x r_y r_z \left(\ln\left(\frac{200}{\alpha^2 \pi}\right)\right)^{\frac{3}{2}}} \tag{28}$$

Using equation (28) enables us to directly use the level-cut Poisson field method to generate random porous materials with certain porosities. No iterative search for the cut level needs to be done. The formula gives an approximate relationship between all the parameters and the porosity, giving more flexibility in a search process for optimal input parameters. In addition, because the ellipsoidal inclusions created by each individual seed is not effected by the seed density, one is able to control the average size and shape of the ellipsoidal inclusions. The mathematical justification of equation (28) is presented in directly below.

Given the input parameters $r_x$, $r_y$, $r_z$ and a the volume of an ellipsoid created by one kernel is equal to:

$$v_{ellipse} = \frac{4\pi}{3} r_x r_y r_z \left(\ln\left(\frac{X_i}{\alpha}\right)\right)^{3/2} \tag{29}$$

The average value of $X_i$ is given by the equation:

$$E[X_i] = 10 E[|N(0,1)|] = 10\sqrt{\left(\frac{2}{\pi}\right)}. \tag{30}$$

So the volume of an ellipse created by the average X; value is equal to:

$$v_{ellipse} = \frac{\sqrt{2}\pi}{3} r_x r_y r_z \left(\ln\left(\frac{200}{\alpha^2 \pi}\right)\right)^{\frac{3}{2}} \tag{31}$$

This value can be used as an approximation of the average volume of an ellipse created by a kernel.

In addition, we know that expected number of kernels in the domain is equal to $$E[N(D')] = \lambda v_{D'}, \tag{32}$$

This gives a simple equation for the expected volume of void space if the ellipsoidal inclusions don't overlap.

$$v_{void} = \lambda v_{D'} v_{ellipse} \tag{33}$$

However, because for many input parameters, the ellipsoids surrounding each kernel frequently overlap with each other, this predicted $v_{void}$ is often far too high. It may lead to a void space volume prediction greater than the domain D' and a porosity estimate greater than 1. In order to quantify the amount of overlap in the system, a simpler connected problem is explored.

Consider a zero matrix with n voxels. Define 1 round as picking with replacement 1 voxel at random to change to a "1". How many rounds is it expected to take to fill m of the n total voxels in the matrix with a 1? Best case scenario, it would require m turns if none of the rounds picked the same voxel twice. However, because picking the same voxel twice will happen occasionally, the actual value is higher than this. For example, the first pixel will certainly take 1 pick because n of the n pixels coincide with picking a new spot. The second pixel will almost certainly take 1 pick as well. However, there is a small chance the pixel chosen the first round will be chosen again. Because only n−1 of the n pixels results in a new pixel, it is expected that $$\frac{n}{n-1}$$

tries are necessary. Therefore the expected number of picks to hit 2 of the n pixels is $$v(2) = \frac{n}{n} + \frac{n}{n-1} \tag{34}$$

Extending this equation to m pixels, the expected number of rounds necessary is $$v(m) = \sum_{k=1}^{m} \left(\frac{n}{n+1-k}\right) \tag{35}$$

Assume now m is a fixed proportion, $\varphi_{target}$ of the number of voxels, n. Then $$\frac{v}{n} = \frac{1}{n} \sum_{k=1}^{n*\varphi_{target}} \left(\frac{n}{n+1-k}\right) = \frac{1}{n} \sum_{k=1}^{n*\varphi_{target}} \left(\frac{1}{1+\frac{1}{n}-\frac{k}{n}}\right) \tag{36}$$

Let $\varphi_{nonoverlapping}$ be the non-overlapping volume proportion one would have to aim for to expect to achieve a volume fraction, $\varphi_{target}$. This equation becomes $$\varphi_{nonoverlapping} = \tag{37}$$

$$\lim_{n \to \infty} \sum_{k=1}^{n*\varphi_{target}} \left(\frac{1}{1+\frac{1}{n}-\frac{k}{n}}\right)\frac{1}{n} = \int_0^{\varphi_{target}} \frac{1}{1-k} dk = -\ln(1-\varphi_{taret})$$

Given a target porosity, $\varphi_{target}$ one needs to choose parameters such that:

$$\frac{v_{void}}{v_{D'}} = \varphi_{nonoverlapping} = -\ln(1-\varphi_{target}) \tag{38}$$

This can be written to solve for the kernel density.

$$\frac{\lambda v_{D'} v_{ellipse}}{v_{D'}} = -\ln(1-\varphi_{target}) \tag{39}$$

$$\lambda = -\frac{\ln(1-\varphi_{target})}{v_{ellipse}} = \frac{-\ln(1-\varphi_{target})}{\frac{\sqrt{2}\pi}{3} r_x r_y r_z \left(\ln\left(\frac{200}{\alpha^2 \pi}\right)\right)^{\frac{3}{2}}} \tag{40}$$

This equation can be manipulated to solve for any of the variables in terms of the others. If one is attempting to create a material with target statistics including a target volume fraction, this equation shrinks the possible set of values by a dimension. In addition, it is worth noting that the correlation function for the level-cut Poisson field defined can be estimated by the equation:

$$E[Y(t_1)Y(t_2)] = Y(t_2) + \varphi^*_{11}(t_1,t_2) + \varphi(t)^2 \qquad (41)$$

where $\varphi^*_{11}(t_1, t_2)$ is the probability that both $t_1$ and $t_2$ are in the same inclusion [Grigoriu, 2003]. Therefore, if one is attempting to match the two-point correlation function, because $\varphi(t)$ is known, only $\varphi^*_{11}(t_1, t_2)$ needs to be targeted in the optimization step of the level-cut Poisson field.

Example 9

Design for Target Pore Size Distribution

Since PTM relies on the medial surface of the void space to extract the pore size distribution, one can design a porous medium with a target pore size distribution simply by iteratively modifying the weighted medial surface. The following algorithm outlines the proposed steps to design a porous structure that attains a normal pore size distribution with mean an standard deviation of $\mu_{target}$ and $\sigma_{target}$:

Step 1. Let $\mu_{target}$ and $\sigma_{target}$ be the mean and standard deviation of the target normal pore size distribution (in voxels). Let $\varepsilon_0 = 0.5$ be the critical tolerance.

Step 2. Generate a random porous media D using the level-cut Poisson field.

Step 3. Find the mean ($\mu$) and standard deviation ($\sigma$) of pore size distribution in D by extracting its weighted medial surface M.

Step 4. Modify the weights (pore sizes) on M so that the pore size distribution is a normal distribution of min ($\mu_{target}$/1.5$\mu$) and $\sigma_{target}$. This is done by using a rank-based normalizing transformation on a vector of all the weights. This transform gives each weight a corresponding value between 0 and 1 equal to $$\frac{r}{n+1},$$

where r is the rank of the weight, and n is the total number of weights. These values are then plugged into the inverse of the cumulative distribution function of the normal distribution. Let the new weighted medial surface be M'.

Step 5. Reconstruct the porous medium using M' and $\beta=0$. Let the new structure be D. Find mean ($\mu_{\beta=0}$) and standard deviation ($\sigma_{\mu_{\beta=0}}$) of pore size distribution in D by extracting its weighted medial surface M.

Step 6. Compute the error $$\varepsilon = \sqrt{\frac{(\mu_{target} - \mu_{\beta=0})^2 + (\sigma_{target} - \sigma_{\beta=0})^2}{2}}.$$

If $\varepsilon \leq \varepsilon_0$, go to step 7. Otherwise, return to step 4.

Step 7. Reconstruct the porous medium using M' and $\beta=0.5$. Let the new structure be D. Find mean ($\mu_{\beta=0.5}$) and standard deviation ($\sigma_{\beta=0.5}$) of pore size distribution in D by extracting its weighted medial surface M.

Step 8. Adjust $$\beta' = 0.5 \left( \frac{\mu_{target} - \mu_{\beta=0}}{\mu_{\beta=0.5} - \mu_{\beta=0}} \right).$$

Step 9. Reconstruct the porous medium using M' and $\beta'$. The resulting porous structure D is the target porous medium.

It should be noted that when the pore sizes are significantly larger than the resolution, one can skip Steps 7-9 and generate the final domain using $\beta=0$.

Example 10

Design for Target Permeability

Similar to the previous section, the proposed algorithm for designing porous materials with target permeability also consists of iterative modification of the medial surface of the input porous structure:

Step 1. Let $k_{target}$ be the target absolute permeability. Let $\varepsilon_0$ be the critical tolerance.

Step 2. Generate a random porous media D using the level-cut Poisson field.

Step 3. Extract the weighted medial surface M of D. Find absolute permeability (k) of D using the PTM algorithm described in Section 2.3.

Step 4. Compute the pore size change ratio $$a = \min\left( \left( \frac{k_{target}}{k} \right)^{1/3}, 2 \right).$$

Update the medial surface using M'=a×M.

Step 5. Reconstruct the porous medium using M' and $\beta=0$. Let the new structure be D. Extract the weighted medial surface M of D. Find absolute permeability ($k_{\beta=0}$) and mean pore size ($\mu$), in voxels.

Step 6. Compute the error $$\varepsilon = \left| \mu \left( 1 - \left( \frac{k_{target}}{k_{\beta=0}} \right)^{1/3} \right) \right|.$$

If $\varepsilon \leq \varepsilon_0$, go to step 7. Otherwise, let $k=k_{\beta=0}$ and return to step 4.

Step 7. Reconstruct the porous medium using M' and $\beta=0.5$. Let the new structure be D. Extract the weighted medial surface M of D. Find absolute permeability ($k_{\beta=0.5}$).

Step 8. Adjust $$\beta' = 0.5 \left( \frac{\left( \frac{k_{target}}{k_{\beta=0}} \right)^{1/3}}{\left( \frac{k_{\beta=0.5}}{k_{\beta=0}} \right)^{1/3}} \right).$$

Step 9. Reconstruct the porous medium using M' and $\beta'$. The resulting porous structure D is the target porous medium.

It should be noted that when the pore sizes are significantly larger than the resolution, one can skip Steps 7-9 and generate the final domain using $\beta=0$.

Figure 19C:
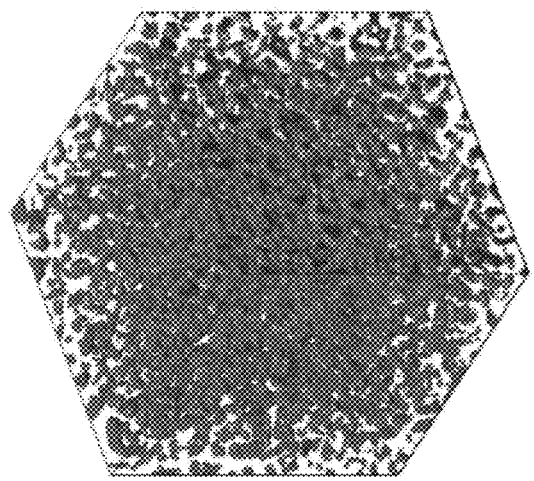
FIG. 19A-19C depicts porous media design.
Figure 19B:
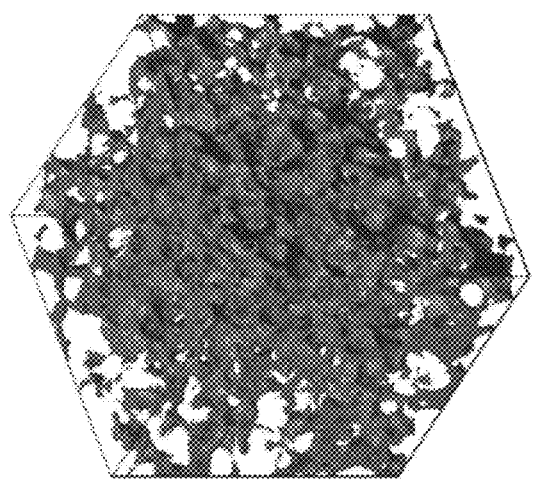
Figure 19A:
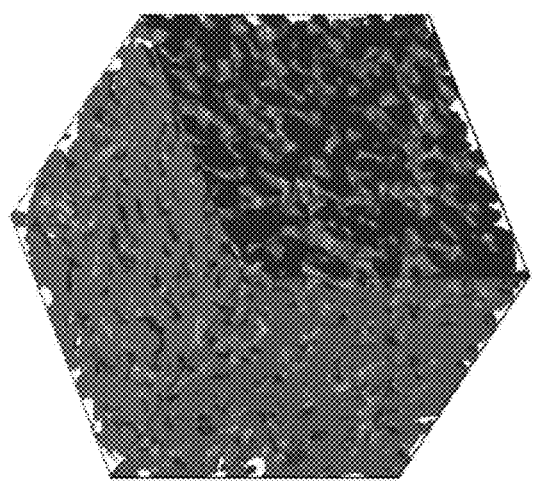

FIG. 19A-C shows an example where the described algorithms in sections Examples 8-10 have been used to generate random porous media with target porosity of 50%, target permeability of 20 Darcy and target normal pore size distribution of 5.00±1.00 voxels, respectively.

Example 11

Results and Discussion for Examples 6-10

The results for 20 different cases are given in this section. The level-cut Poisson field parameters used to generate the 20 domains are given in Table 3.

TABLE 3

Level-Cut Poisson Field
Input Parameters for 20 Cases

| Case Number | α | $r_1$ | $r_2$ | $r_3$ | λ | Target Porosity |
|---|---|---|---|---|---|---|
| 1 | 1 | 3 | 3 | 3 | 0.000311269 | 0.9 |
| 2 | 1 | 8 | 8 | 3 | 4.38E−05 | 0.9 |
| 3 | 1 | 12 | 3 | 3 | 7.78E−05 | 0.9 |
| 4 | 1 | 3 | 3 | 3 | 0.001053732 | 0.7 |
| 5 | 1 | 8 | 8 | 3 | 0.000148181 | 0.7 |
| 6 | 1 | 12 | 3 | 3 | 0.000263433 | 0.7 |
| 7 | 1 | 3 | 3 | 3 | 0.002047779 | 0.5 |
| 8 | 1 | 8 | 8 | 3 | 0.000287969 | 0.5 |
| 9 | 1 | 12 | 3 | 3 | 0.000511945 | 0.5 |
| 10 | 1 | 12 | 12 | 12 | 3.20E−05 | 0.5 |
| 11 | 1 | 12 | 12 | 3 | 0.000127986 | 0.5 |
| 12 | 1 | 16 | 16 | 3 | 7.20E−05 | 0.5 |
| 13 | 1 | 16 | 3 | 3 | 3.84E−04 | 0.5 |
| 14 | 1 | 20 | 3 | 3 | 0.000307167 | 0.5 |
| 15 | 1 | 3 | 3 | 3 | 0.003556921 | 0.3 |
| 16 | 1 | 8 | 8 | 3 | 0.000500192 | 0.3 |
| 17 | 1 | 12 | 3 | 3 | 0.00088923 | 0.3 |
| 18 | 1 | 3 | 3 | 3 | 0.006802574 | 0.1 |
| 19 | 1 | 8 | 8 | 3 | 0.000956612 | 0.1 |
| 20 | 1 | 12 | 3 | 3 | 0.001700643 | 0.1 |

Design for target porosity: In this section equation (28) is used to generate materials with a target porosity, and the output material is compared to this target porosity. Two different types of porosity are defined—the actual and the effective porosity. The actual porosity (φ) of a porous medium is defined as the ratio of void space volume to the total volume of the porous medium. This is the porosity that equation (28) is aiming to match. For the sake of this paper, the effective porosity is defined as the amount of void space connecting the top and bottom of the domain divided by the total volume. This coincides with the boundary condition assuming no mass flux through the sides of the domain. The effective porosity is always less than or equal to the actual porosity.

Figure 20:
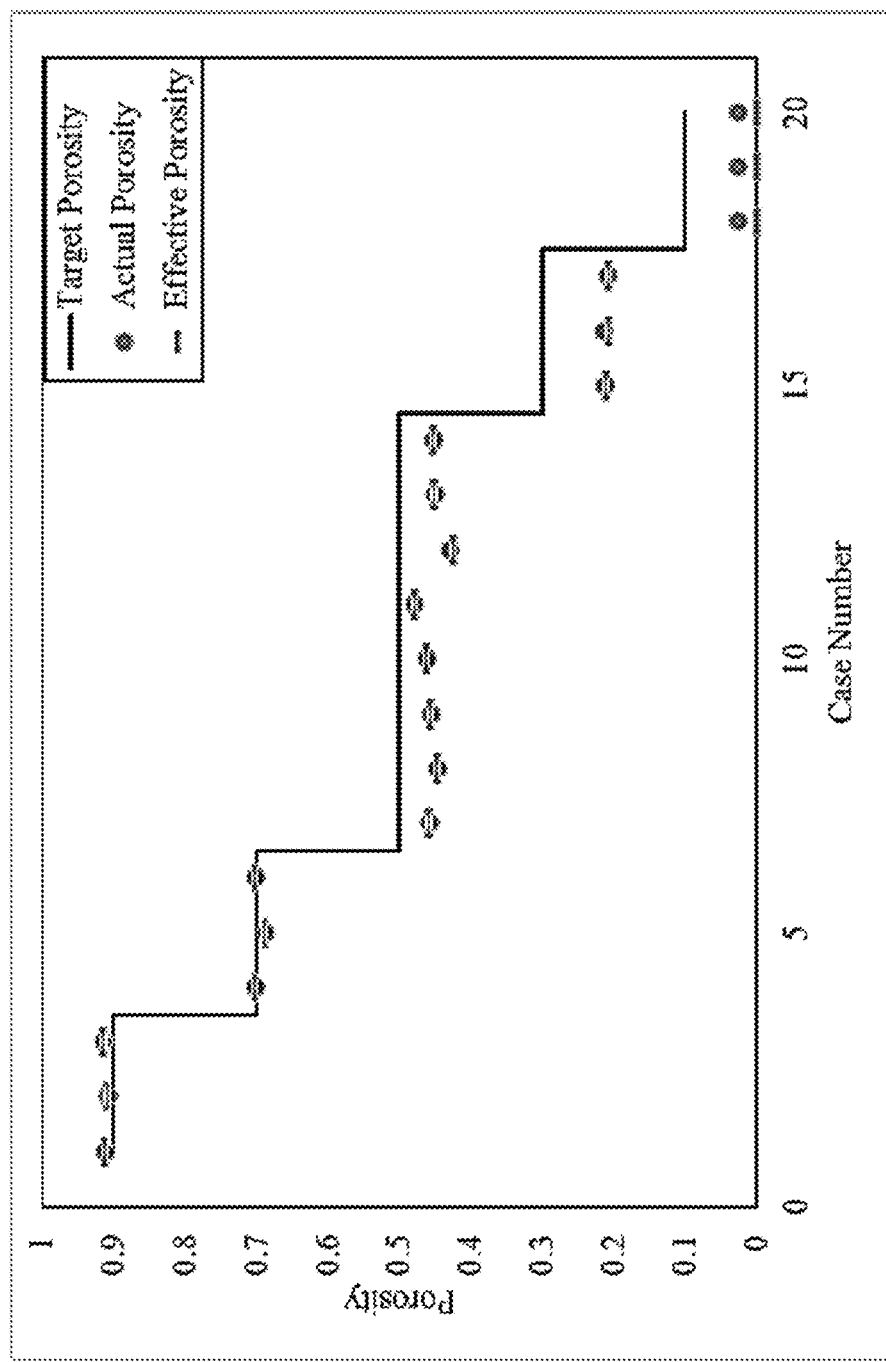
FIG. 20 depicts the comparison of the target to the actual and effective porosities of the 20 different domains.

The values for $r_x$, $r_y$, $r_z$, α were predetermined, and the value for Λ was calculated using equation (28) in order to coincide with a given target actual porosity. The actual porosity (φ) of a porous medium is defined as the ratio of void space volume to the total volume of the porous medium. Effective porosity is defined as the amount of void space connecting the top and bottom of the domain divided by the total volume. This coincides with the boundary condition assuming no mass flux through the sides of the domain. The effective porosity is always less than or equal to the actual porosity. FIG. 20 gives the comparison of the target to the actual and effective porosities of the 20 different domains.

It should be noted that the effective porosity was not concurrent with the actual porosity when the target was below 25% (Cases 18, 19, 20). In addition, there is significant error between the target and actual porosities, especially for cases with lower porosities.

Figure 21:
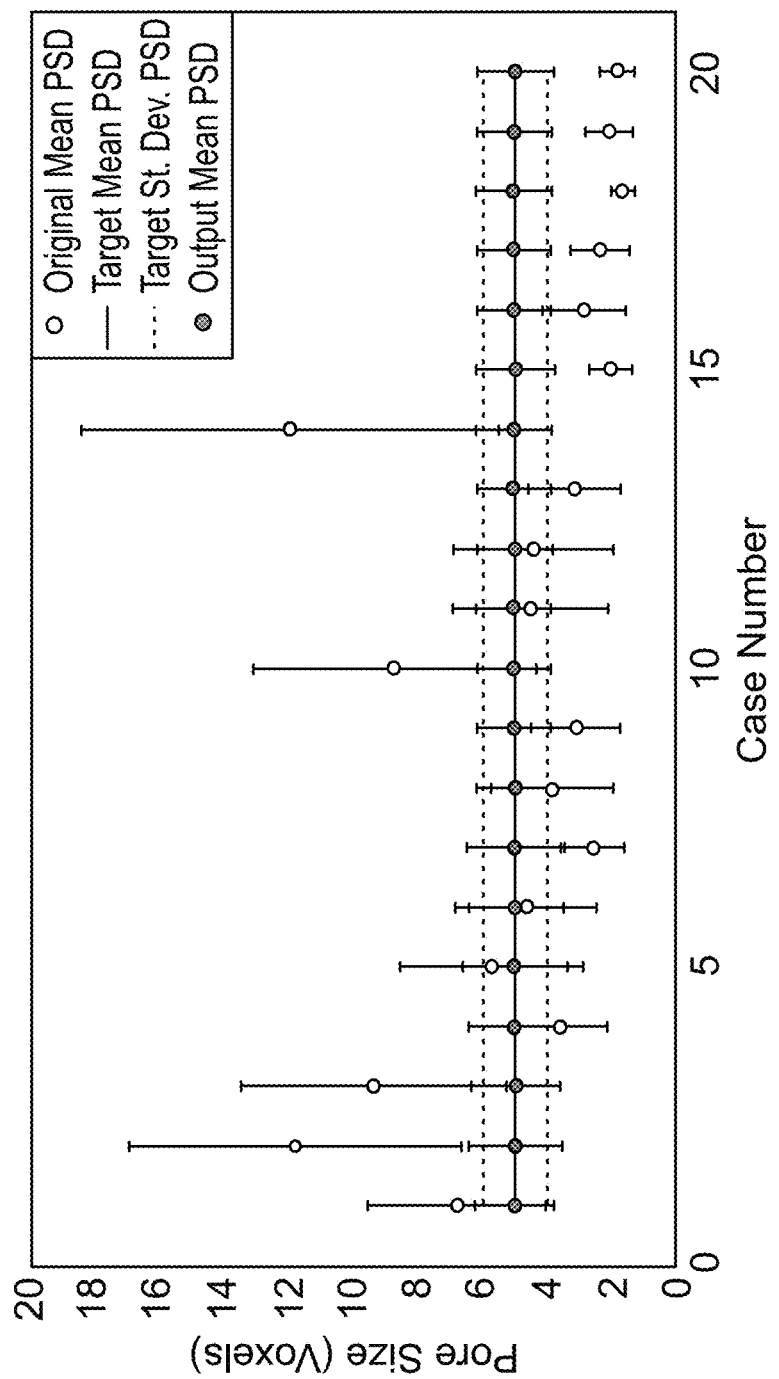
FIG. 21 depicts pore size distribution with target mean of 5 μm and a standard deviation of 1 μm.
Figure 22:
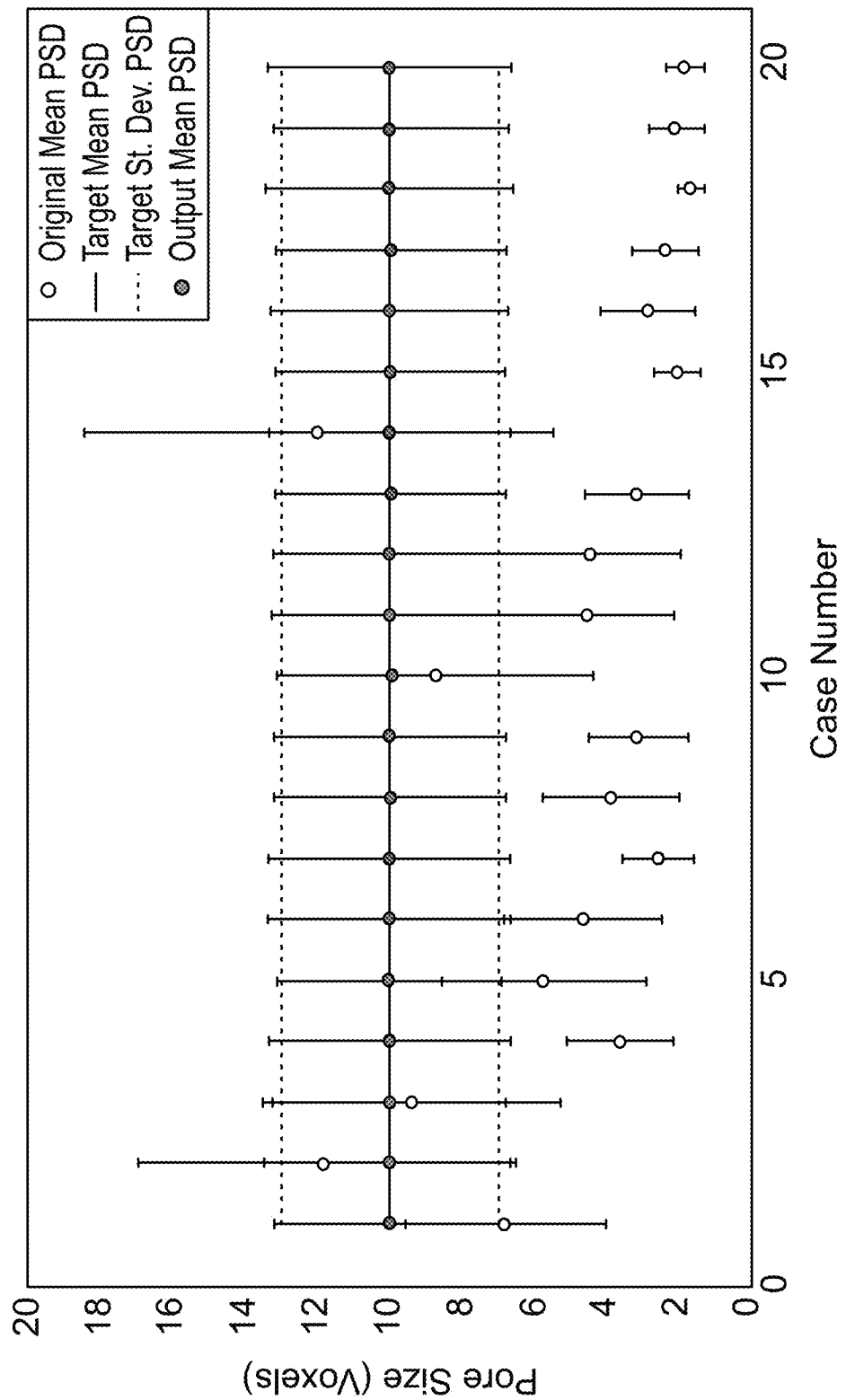
FIG. 22 depicts pore size distribution with target mean of 10 μm and a standard deviation of 3 μm.

Design for target pore size distribution: The same 20 cases given in Table 3 are manipulated 2 different ways to give FIG. 21 and FIG. 22. The cases are manipulated in order to achieve two normal pore size distributions with means, 5 μm and 10 μm, and standard deviation, 1 μm and 3 μm, respectively. The comparison of the original, new and target average pore sizes is given for all 20 cases in FIG. 21 and FIG. 22. This also includes error bars which represent the standard deviations of the different domains. The manipulations were very effective in achieving the target mean and standard deviation of the material.

Figure 23:
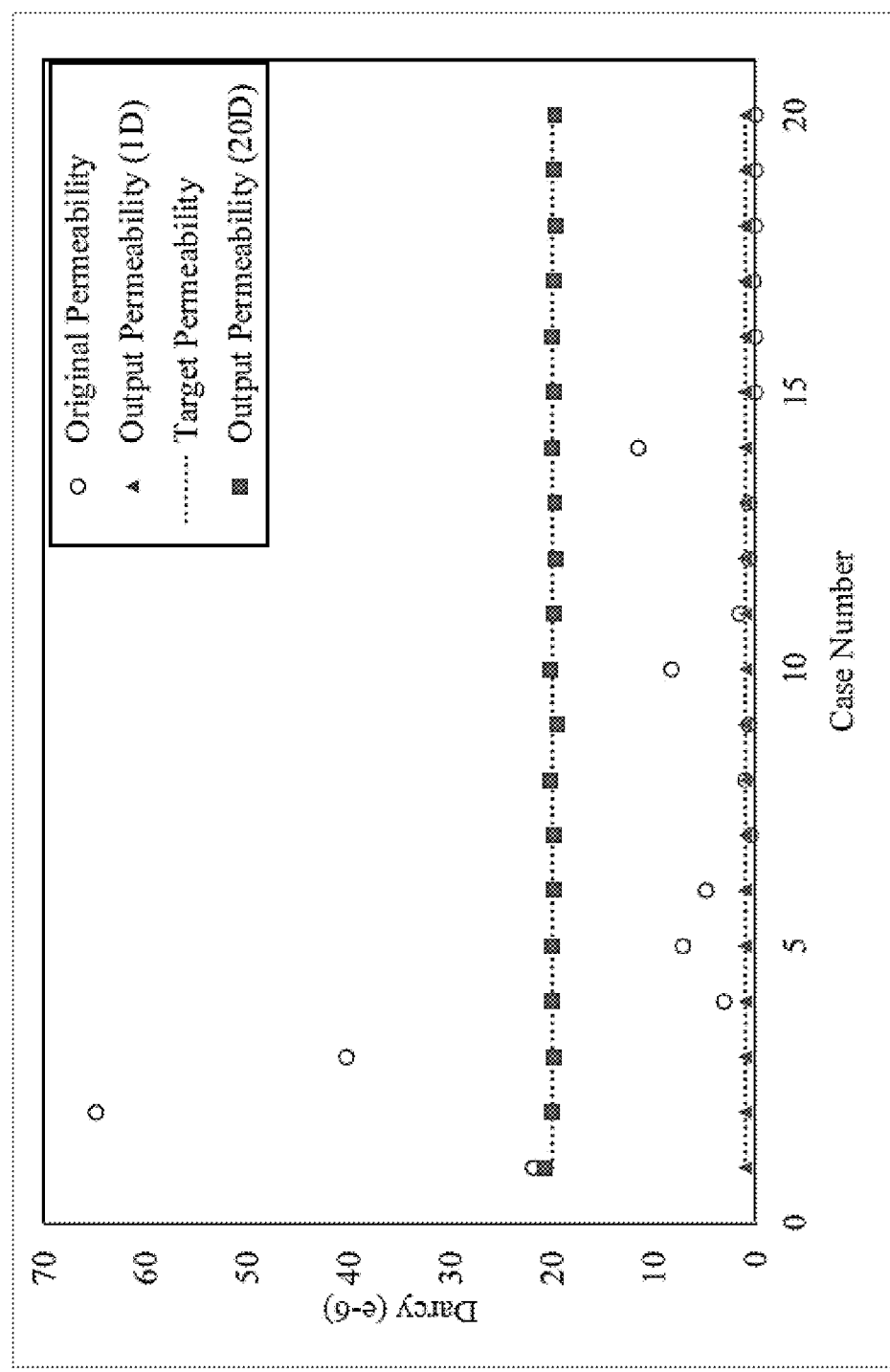
FIG. 23 depicts the results of manipulations on the 20 cases for both a target permeability of 1 Darcy and 20 Darcy.

Design for target permeability: FIG. 23 gives the results of manipulations on the 20 cases for both a target permeability of 1 Darcy and 20 Darcy. These results show that with some manipulation on the medial surface, any of the cases can be made into materials with a wide range of permeability values. Similar to the pore size distribution, sometimes the material had to undergo multiple iterations of manipulation to get to the target parameter.

Discussion: The relationship developed between the level-cut Poisson field method parameters and the output porosity is shown in the results to be able to target different porosities approximately. This relationship allows one to set the target porosity, and to change the input parameters to achieve any other target properties. For example, one could do what was done here and choose the seed density based on the other input parameters and the target porosity.

Unfortunately this formula does have some serious limitations. For lower porosities—below 30%—the parameters chosen through this process do not achieve the target porosity. In addition, other more direct methods such as changing the cut value a or iteratively checking the porosity after each seed is added are more accurate in achieving the target porosity, especially for the low porosity cases.

This formula therefore finds its main utility as a general relationship. The level-cut Poisson field method is useful because it allows creation of many different materials. Generally, one has to using methods such as genetic algorithms or iterative search algorithms to search through the 5 parameters, α, $r_x$, $r_y$, $r_z$, λ to find the values that best create a material with the target statistical or physical descriptors given. This formula allows the user to choose any four of the input parameters to target a statistical or physical descriptors besides porosity. The fifth parameter can then be chosen in order to hit the target porosity. In other words, this relationship between the parameters and the porosity shrinks the space in which one searches for input parameters to reach statistical or physical descriptors.

The manipulation method was used successfully to reach a target pore size distribution. For all 20 cases, the maximum error for the average mean was under 2%. In addition, the materials generated using the level-cut Poisson field did not target pore size distributions and therefore had a variety of initial pore size distributions. This showed the robustness of the medial surface manipulation to create a pore size distribution even with a wide range of input materials. Future work could more directly look at image reconstruction by having the original material more closely related to a target image obtained, then using the medial surface manipulation to generate a material more similar to the original.

A simpler method for design is using some kind of searching algorithm to find the optimal input parameters for the level-cut Poisson field. This method requires creating multiple materials each with different input parameters and comparing the outputs to find the optimal input parameters. This is a more straight forward approach than the medial surface manipulation in this paper. In addition, once you have the final parameters, one could create as many of the virtual materials as one needed.

On the other hand, the method described here works in fewer iterations than the straightforward approach. In addition, the method allows for more variation in the domain. While the straightforward approach creates materials of approximately overlapping ellipses, the medial surface approach often changes the domain significantly and is no longer merely overlapping ellipses.

A simulated annealing method works by randomly switching void space and solid space in a domain while searching for a domain with the target statistical properties. This method is robust in finding a vast amount of statistical parameters. However, the method takes a very long time with tens of thousands of iterations. The method described in this work converges more quickly and allows more direct control of the shape of the domain. The medial surface manipulation not only has potential to be used in creating materials with target properties, but also has potential in being used to generate materials with target properties. Despite the original materials having a wide range of permeability values, the manipulation successfully converged to the target permeability.

Porous material design includes finding materials with certain effective properties. This is important as the connections between microstructure and effective properties is explored. In addition, the iterative algorithm presented has potential to be developed into a topology optimization method. In this paper, the target effective properties were created. However, it is possible if one was to iteratively manipulate the medial surface of the solid and void space, one may be able to create materials with optimal material properties.

The medial surface manipulation is not limited to being a second step of the Level-cut Poisson field method, but could also be used as a second step to many other approaches such as simulated annealing and level-cut Gaussian fields. It is not limited to the level-cut Poisson field method.

In addition, the medial surface manipulation does not introduce any randomness to the domain. Therefore, to create a random material it is necessary that the material is random before the iterative algorithm is used.

These results show agreement between the target and achieved parameters. The manipulations on the medial surface serve as an efficient method for topology manipulation.

All documents cited are incorporated herein by reference; the citation of any document is not to be construed as an admission that it is prior art with respect to the present invention.

What is claimed:

1. A method for topological and geometric characterization of a three-dimensional porous material or medium, said method comprising:
   receiving an image of a three-dimensional porous material or medium configured to be disposed in a fluid flow-path, said porous material or medium comprising a void space;
   receiving a target pore size distribution and a target permeability;
   extracting a medial surface of the void space of the porous material or medium based on the image;
   calculating a pore size distribution of the void space and a permeability of the porous material or medium based on the extracted medial surface of the void space;
   setting the porous material or medium as an initial porous material or medium;
   modifying the pore size distribution and the permeability of the porous material or medium based on the target pore size distribution and the target permeability, respectively; and
   generating a new porous material or medium having the target pore size distribution and the target permeability by utilizing the extracted medial surface of the void space of the initial porous material or medium as a representative geometry of the porous material or medium.

2. The method of claim 1, wherein said image of the three-dimensional porous material or medium comprises a voxelized binary image of the porous material or medium.

3. The method of claim 2, wherein said extracted medial surface is a voxel-wide medial surface.

4. The method of claim 1, wherein the medial surface comprises a plurality of voxels, and calculating the pore size distribution of the void space of the porous material or medium based on the extracted medial surface of the void space comprises assigning a value r to each voxel on the medial surface, wherein r is equal to a distance between the medial surface voxel and a closest solid boundary, and wherein the pore size distribution of the porous material or medium is the distribution of r values on the medial surface voxels.

5. A method for characterizing fluid flow through a three-dimensional porous material or medium, the method comprising:
   receiving an image of a three-dimensional porous material or medium configured to be disposed in a fluid flow-path, said porous material or medium comprising a void space;
   receiving a target permeability;
   extracting a medial surface of the void space of the porous material or medium based on the image;
   calculating an absolute permeability of the porous material or medium based on the extracted medial surface of the void space;
   simulating multiphase drainage and/or simulating multiphase imbibition of the porous material or medium, said simulating comprising utilizing the extracted medial surface of the void space of the porous material or medium as a solution domain for determining fluid flow through the porous material or medium;
   setting the porous material or medium as an initial porous material or medium;
   initiating an iterative process;
   modifying the absolute permeability based on the target permeability;
   generating a new porous material or medium having the target permeability by utilizing the extracted medial surface of the void space of the initial porous material or medium as a representative geometry of the new porous material or medium;
   simulating multiphase drainage and/or simulating multiphase imbibition of the new porous material or medium;
   determining whether the degree of pore connectivity of the new porous material or medium meets or exceeds the degree of pore connectivity of the initial porous material or medium by comparing the new porous material or medium simulation and the initial porous material or medium simulation; and
   terminating the iterative process in response to the pore connectivity of the new porous material or medium meeting or exceeding the pore connectivity of the initial porous material or medium.

6. The method of claim 5, wherein said image of the three-dimensional porous material or medium comprises a voxelized binary image of the porous material or medium.

7. The method of claim 6, wherein said extracted medial surface is a voxel-wide medial surface.

8. The method of claim 7, wherein calculating the absolute permeability of the porous material or medium based on the extracted medial surface of the void space comprises:
   calculating a hydraulic conductivity value at each voxel on the medial surface;
   calculating a pressure field based at least in part on the local hydraulic conductivity at each voxel on the medial surface;
   calculating the total flow rate at a bottom solid boundary of the medial surface based at least in part on the calculated hydraulic conductivity value and calculated pressure field; and
   calculating the absolute permeability based at least in part on a calculated total flow rate at the bottom solid boundary of the medial surface and an applied pressure difference across the porous material or medium.

9. The method of claim 7, wherein simulating multiphase drainage further comprises:
   assigning an entry capillary pressure to each voxel of said medial surface; and
   increasing a pressure of a non-wetting phase reservoir until said non-wetting phase reservoir pressure exceeds the entry capillary pressure of voxels connected to the non-wetting phase reservoir; and
   determining a wetting phase saturation at an incrementally increasing non-wetting phase pressure above said entry capillary pressure of a voxel connected to the non-wetting phase reservoir.

10. The method of claim 9, wherein assigning an entry capillary pressure to each voxel of said medial surface comprises computing the entry capillary pressure for each voxel according to $P^c = (1.5 \sigma \cos(\Theta))/r$, wherein $P^c$ is the entry capillary pressure of the medial surface voxel, $\Theta$ is a contact angle of the medial surface voxel, $\sigma$ is a surface tension of the medial surface voxel, and r is a distance between the medial surface voxel and the closest solid boundary.

11. The method of claim 9, wherein determining the wetting phase saturation at said incrementally increasing non-wetting phase pressure above said entry capillary pressure of voxels connected to the non-wetting phase reservoir comprises:
   computing the wetting phase saturation at each pressure difference according to $S^w = (\Sigma_i r_i)/(\Sigma_j r_j)$, wherein $S^w$ is the wetting phase saturation, r is a minimum distance between each voxel of the medial surface and a closest solid boundary, i=1, . . . , I, wherein I is a number of medial surface voxels occupied by the wetting phase, and j=1, . . . , J, wherein J is a total number of voxels on the medial surface.

12. The method of claim 7, wherein simulating imbibition further comprises:
   assigning an entry capillary pressure to each voxel of said medial surface; and
   starting at a pressure difference between a non-wetting phase reservoir pressure and a wetting phase reservoir pressure that corresponds to about a zero percent saturation of a wetting phase, decreasing the pressure of the non-wetting phase reservoir; and
   determining a wetting phase saturation at an incrementally decreasing non-wetting phase pressure.

13. The method of claim 12, wherein determining the wetting phase saturation at said incrementally decreasing non-wetting phase pressure comprises:
   computing the wetting phase saturation at each pressure difference according to $S^w = (\Sigma_i r_i)/(\Sigma_j r_j)$, wherein $S^w$ is the wetting phase saturation, r is a minimum distance between each voxel of the medial surface and a closest solid boundary, i=1, . . . , I, wherein I is a number of medial surface voxels occupied by the wetting phase, and j=1, . . . , J, wherein J is a total number of voxels on the medial surface.

14. The method of claim 5, wherein calculating the absolute permeability of the porous material or medium based on the extracted medial surface of the void space is determined according to $k = -((Q\mu L)/(A\Delta P))$, wherein k is the absolute permeability of the porous material or medium, Q is the total flow rate at a bottom solid boundary of the medial surface, $\mu$ is the fluid viscosity, L is a length of the porous material or medium, A is a cross-sectional area of the porous material or medium, and $\Delta P$ is an applied pressure difference across the porous material or medium.

15. A method for designing a three-dimensional porous material or medium with target properties, said method comprising:
   receiving as input, an image of a random, three-dimensional porous material or medium configured to be disposed in a fluid flow-path, said porous material or medium comprising a void space;
   receiving as further input a target pore size distribution and a target permeability;
   extracting a medial surface of the void space of the porous material or medium;
   setting the porous material or medium as an initial porous material or medium;
   calculating the pore size distribution of the void space of the porous material or medium based on the extracted medial surface of the void space;
   calculating an absolute permeability of the porous material or medium based on the extracted medial surface of the void space;
   modifying the pore size distribution of the void space of the porous material or medium based on the target pore size distribution;
   modifying the absolute permeability of the porous material or medium based on the target permeability;
   calculating a first error value based on a mean and standard deviation of the pore size distribution and the modified pore size distribution;
   calculating a second error value based on a mean and standard deviation of the absolute permeability and the modified absolute permeability;
   determining whether the first and second error values are less than threshold values; and
   in response to determining that the error values are less than the threshold values, generating a new porous material or medium as a representative geometry of the new porous material or medium.

16. The method of claim 15, wherein said image of the three-dimensional porous material or medium comprises a voxelized binary image of the porous material or medium.

17. The method of claim 16, wherein said extracted medial surface is a voxel-wide medial surface.

18. The method of claim 17, wherein said calculating the pore size distribution comprises calculating the mean and standard deviation of the pore size distribution of the extracted medial surface of the random, three-dimensional porous material or medium.

19. The method of claim 17, wherein calculating the absolute permeability of the porous material or medium based on the extracted medial surface of the void space comprises:
- calculating a hydraulic conductivity value at each voxel on the medial surface;
- calculating a pressure field based at least in part on the hydraulic conductivity at each voxel on the medial surface;
- calculating a total flow rate at a bottom solid boundary of the medial surface based at least in part on the calculated hydraulic conductivity value and calculated pressure field; and
- calculating the absolute permeability based at least in part on the calculated total flow rate at the bottom solid boundary of the medial surface and an applied pressure difference across the porous material or medium.

20. The method of claim 19, further comprising:
- computing a pore size change ratio according to $a=\min((k_{target}/k)^{1/3},2)$, wherein a is the pore size change ratio, $k_{target}$ is a target absolute permeability, and k is the absolute permeability of the porous material or medium;
- updating the extracted medial surface of the void space of the porous material or medium to create a modified medial surface with a target absolute permeability; and
- reconstructing a porous material or medium from the modified medial surface having the target absolute permeability.

21. The method of claim 15, wherein calculating the absolute permeability of the porous material or medium based on the extracted medial surface of the void space is determined according to $k=-((Q\mu L)/(A\Delta P))$, wherein k is the absolute permeability of the porous material or medium, Q is a total flow rate at a bottom solid boundary of the medial surface, $\mu$ is a fluid viscosity, L is a length of the porous material or medium, A is a cross-sectional area of the porous material or medium, and $\Delta P$ is an applied pressure difference across the porous material or medium.

* * * * *